US011122727B2

(12) United States Patent
Tanaka

(10) Patent No.: US 11,122,727 B2
(45) Date of Patent: Sep. 21, 2021

(54) WORKING VEHICLE

(71) Applicant: MITSUBISHI MAHINDRA AGRICULTURAL MACHINERY CO., LTD., Shimane (JP)

(72) Inventor: Takeji Tanaka, Shimane (JP)

(73) Assignee: MITSUBISHI MAHINDRA AGRICULTURAL MACHINERY CO., LTD., Shimane (JP)

( * ) Notice: Subject to any disclaimer, the term of this patent is extended or adjusted under 35 U.S.C. 154(b) by 232 days.

(21) Appl. No.: 16/452,838

(22) Filed: Jun. 26, 2019

(65) Prior Publication Data
US 2019/0313567 A1 Oct. 17, 2019

Related U.S. Application Data

(63) Continuation of application No. PCT/JP2017/046575, filed on Dec. 26, 2017.

(30) Foreign Application Priority Data

Dec. 27, 2016 (JP) .............................. JP2016-252419
Dec. 27, 2016 (JP) .............................. JP2016-252420
(Continued)

(51) Int. Cl.
*A01B 63/08* (2006.01)
*A01B 69/00* (2006.01)
(Continued)

(52) U.S. Cl.
CPC ............ *A01B 63/08* (2013.01); *A01B 69/005* (2013.01); *A01B 69/007* (2013.01); *A01C 11/006* (2013.01); *A01C 11/02* (2013.01)

(58) Field of Classification Search
CPC ..... A01B 63/08; A01B 69/005; A01B 69/007; A01C 11/006; A01C 11/02
See application file for complete search history.

(56) References Cited

U.S. PATENT DOCUMENTS

| 4,715,012 A * | 12/1987 | Mueller, Jr. et al. ........................ A01B 63/112 701/50 |
| 5,103,924 A * | 4/1992 | Walker ................. A01B 69/005 104/244.1 |
| 2006/0178823 A1* | 8/2006 | Eglington et al. ... G05D 1/0278 701/414 |

FOREIGN PATENT DOCUMENTS

| JP | 2010-119363 | 6/2010 |
| JP | 4605622 | 1/2011 |

(Continued)

OTHER PUBLICATIONS

International Search Report dated Mar. 27, 2018 in International (PCT) Application No. PCT/JP2017/046575.

*Primary Examiner* — Tara Mayo-Pinnock
(74) *Attorney, Agent, or Firm* — Wenderoth, Lind & Ponack, L.L.P.

(57) ABSTRACT

A working vehicle includes a traveling body supported by a traveling apparatus, a steering portion that steers the traveling body, a lifting/lowering apparatus that lifts and lowers a working machine, and a controller configured to execute a turning control including setting a working machine descent start line, calculating coordinates of the traveling body based on a steering operation and a traveling distance of the traveling apparatus, and in a case where the traveling body has reached the working machine descent start line in a state in which the traveling body has completed the turning, starting lowering the working machine by the lifting/lowering apparatus.

3 Claims, 19 Drawing Sheets

(30) Foreign Application Priority Data

Dec. 27, 2016 (JP) .............................. JP2016-252421
Dec. 27, 2016 (JP) .............................. JP2016-252422
Dec. 27, 2016 (JP) .............................. JP2016-252423

(51) Int. Cl.
*A01B 69/06* (2006.01)
*A01C 11/00* (2006.01)
*A01C 11/02* (2006.01)

(56) References Cited

FOREIGN PATENT DOCUMENTS

| | | |
|---|---|---|
| JP | 2014-103891 | 6/2014 |
| JP | 2015-112070 | 6/2015 |
| JP | 5751314 | 7/2015 |

* cited by examiner

FIG.18A
1: AUTO-DOWN CANCELLATION STATE SCREEN

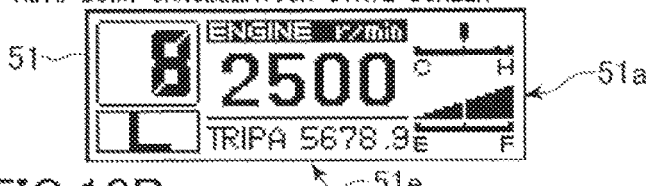

FRONT-REAR DIRECTION DISPLAY
PORTION AND ANGLE DISPLAY PORTION

FIG.18H

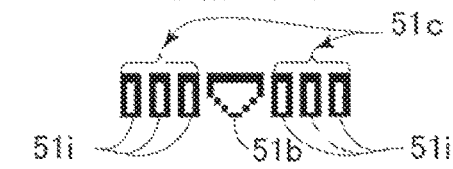

FIG.18B
2: AUTO-DOWN CONTROL STARTED

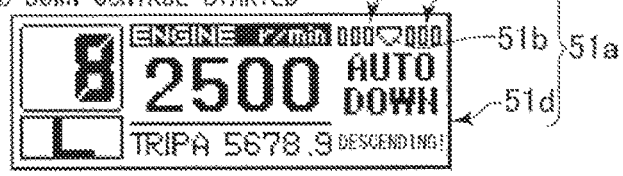

FIG.18I

FIG.18C
3: AUTO-DOWN CONTROL WORKING MACHINE DESCENT STOPPED

FIG.18J

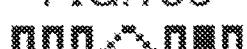

FIG.18K

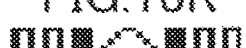

FIG.18D
4: AUTO-DOWN CONTROL WORKING MACHINE DESCENT TEMPORARILY STOPPED

FIG.18M

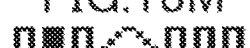

FIG.18N

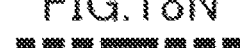

FIG.18E
5: AUTO-DOWN CONTROL WORKING MACHINE DESCENDING SCREEN

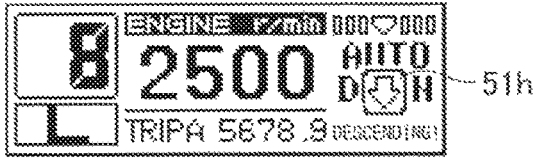

FIG.18P

FIG.18F
6: AUTO-DOWN CONTROL POSITION NOTIFICATION SCREEN

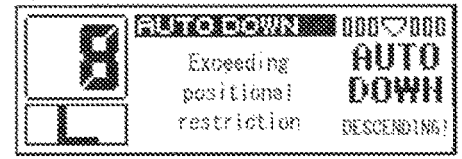

FIG.18G
7: AUTO-DOWN CONTROL POSITION CANCELLATION SCREEN

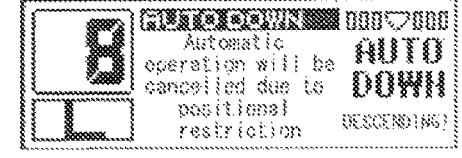

WORKING VEHICLE

CROSS-REFERENCE TO RELATED APPLICATIONS

This application is a Continuation of International Patent Application No. PCT/JP2017/046575, filed Dec. 26, 2017, which claims the benefits of Japanese Patent Application No. 2016-252419, filed Dec. 27, 2016, Japanese Patent Application No. 2016-252420, filed. Dec. 27, 2016, Japanese Patent Application No. 2016-252421, filed Dec. 27, 2016, Japanese Patent Application No. 2016-252422, filed Dec. 27, 2016, and Japanese Patent Application No. 2016-252423, filed Dec. 27, 2016, both of which are hereby incorporated by reference herein in their entirety.

BACKGROUND OF THE INVENTION

Field of the Invention

The present invention relates to a working vehicle such as a tractor or a riding-type rice planter, and specifically to control of a lifting/lowering apparatus that lifts and lowers a working machine.

Background Art

Conventionally, according to Japanese Patent No. 4605622, for operations performed in fields such as cultivation and planting, a working vehicle including a working machine automatic control mechanism that operates at the time of turning in a headland is proposed. In this working vehicle, when the front wheels are steered in a state in which the body has reached the headland, accumulation of traveling distance of the body is started by a distance sensor and a working apparatus is lifted, and when the traveling distance of the body reaches a set distance, the working apparatus is lowered.

However, since the working apparatus of the one described in Japanese Patent No. 4605622 described above descends when the traveling distance reaches the set distance even in the case where it is not a desired descent timing of the working apparatus if there is an error in the steering operation at the time of turning in the headland, the operator is required to have a high steering skill to perform an operation by making the headland width from a ridge edge constant at an appropriate width.

SUMMARY OF THE INVENTION

According to one aspect of the present invention, a working vehicle includes a traveling body supported by a traveling apparatus, a steering portion that steers the traveling body, a lifting/lowering apparatus that lifts and lowers a working machine, and a controller configured to execute a turning control of setting a working machine descent start line in a coordinate system having a position of the traveling body at a start of turning as an origin, calculating coordinates of the traveling body based on a steering operation of the steering portion and a traveling distance of the traveling apparatus, and in a case where the traveling body has reached the working machine descent start line in a state in which the traveling body has completed the turning, starting lowering the working machine by the lifting/lowering apparatus.

Further features of the present invention will become apparent from the following description of exemplary embodiments with reference to the attached drawings.

BRIEF DESCRIPTION OF THE DRAWINGS

FIG. 18A is a diagram illustrating an auto-down cancelled state screen.

FIG. 18B is a diagram illustrating a screen displayed in an auto-down control execution state.

FIG. 18C is a diagram illustrating a screen displayed when descent of a rotary cultivator by auto-down control is stopped.

FIG. 18D is a diagram illustrating a screen displayed when descent of the rotary cultivator by auto-down control is temporarily stopped.

FIG. 18E is a diagram illustrating a screen displayed while the rotary cultivator is descending by auto-down control.

FIG. 18F is a diagram illustrating an auto-down control position notification screen.

FIG. 18G is a diagram illustrating an auto-down control position cancellation screen.

FIG. 18H is an enlarged view of a screen displayed when a body angle is within a first angle range.

FIG. 18I is an enlarged view of a screen displayed when the body angle is within a second angle range.

FIG. 18J is an enlarged view of a screen displayed when the body angle is within a third angle range.

FIG. 18K is an enlarged view of a screen displayed when the body angle is within a turning completion angle range and a Y coordinate of a traveling body is out of a predetermined range.

FIG. 18M is an enlarged view of a screen displayed when the body angle is within a fourth angle range.

FIG. 18N is an enlarged view of a screen displayed when the body angle is within a fifth angle range.

FIG. 18P is an enlarged view of a screen displayed when the body angle is within the turning completion angle range and the Y coordinate of the traveling body is within the predetermined range.

DESCRIPTION OF THE EMBODIMENTS

Overall Configuration

Figure 1:
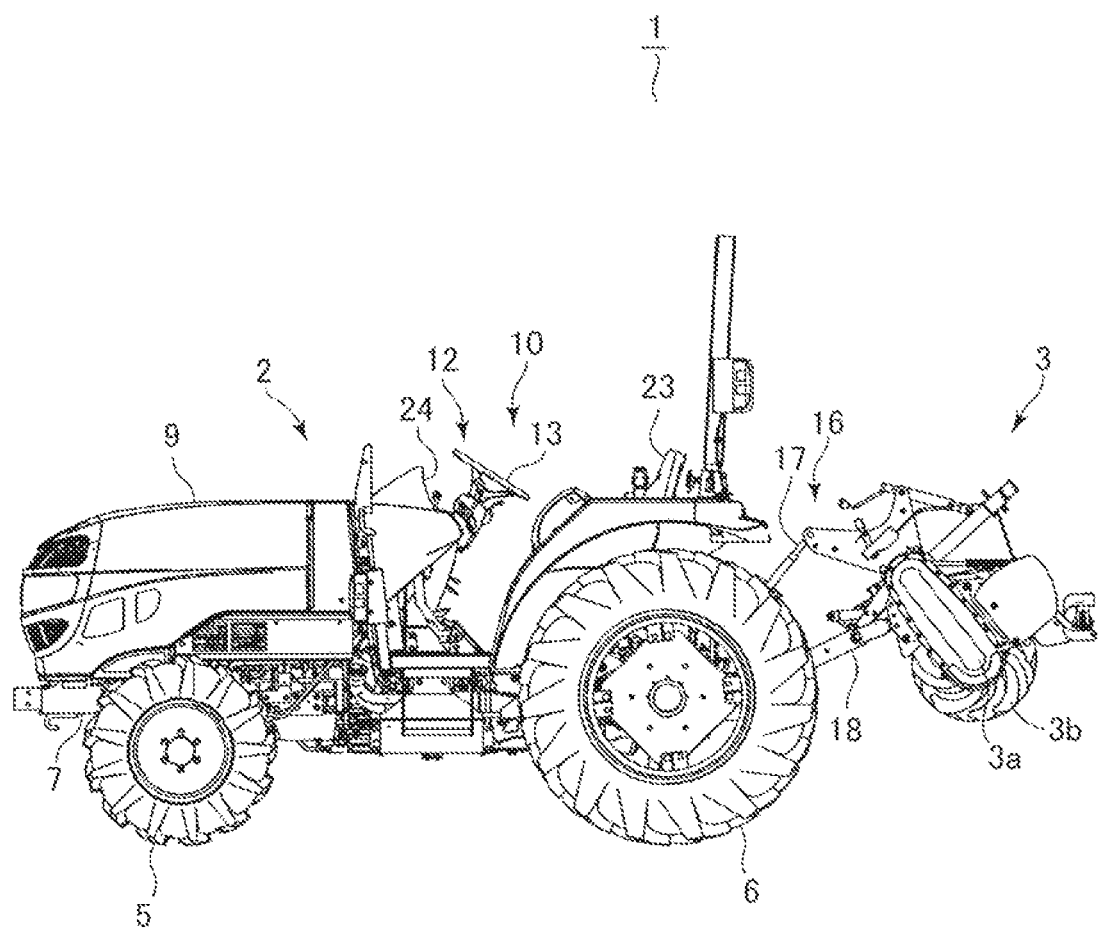
FIG. 1 is a side view of a tractor according to an embodiment.

The present embodiment will be described below with reference to drawings. As illustrated in FIG. 1, a tractor 1 serving as a working vehicle according to the present embodiment includes a traveling body 2 and a rotary cultivator 3 including a rotary 3b that rotates and serving as a working machine that is coupled to a rear portion of the traveling body 2 so as to be capable of ascending and descending. The traveling body 2 includes a controller 52 illustrated in FIG. 7 that controls input and output of each electric signal, and front wheels 5 and rear wheels 6 that serve as a traveling apparatus. The front wheels 5 and the rear wheels 6 are each provided as a pair respectively disposed on the left and the right, and the traveling body 2 is steered by steering the front wheels 5 to the left and the right. In addition, the traveling body 2 includes a body frame 7 supported by the front wheels 5 and the rear wheels 6 and a driving portion 10 including a driver's seat 23 on which an operator sits. To be noted, in the present embodiment, the direction in which the operator seated on the driver's seat 23 of the tractor 1 placed on a horizontal surface looks is regarded as forward, which is the direction of the traveling body 2, unless otherwise described, and the front-rear and left-right directions are defined on the basis of this. A notification buzzer 53 capable of notifying various information to the operator by making a sound is provided on the output side of the controller 52, and is operated by an output signal from the controller 52.

Driving Force Transmission Structure

The body frame 7 includes an unillustrated engine that generates a driving force for driving the front wheels 5 and the rear wheels 6, an engine room 9 that accommodates the engine, and an unillustrated transmission case disposed between the left and right rear wheels 6.

The transmission case accommodates therein an unillustrated traveling transmission that shifts gears for the driving force of the engine, and an unillustrated main transmission mechanism that shifts gears for the driving force of the engine among multiple speeds, an unillustrated sub-transmission mechanism that shifts gears for the driving force transmitted by the main transmission mechanism further among multiple speeds, and a Power Take-Off (PTO transmission mechanism that shifts gears for the driving force to an unillustrated PTO shaft are incorporated therein. The field is cultivated as a result of the rotation of the PTO shaft being transmitted to the rotary cultivator 3 and thus the rotary 3b rotating about a rotary shaft 3a.

Figure 7:
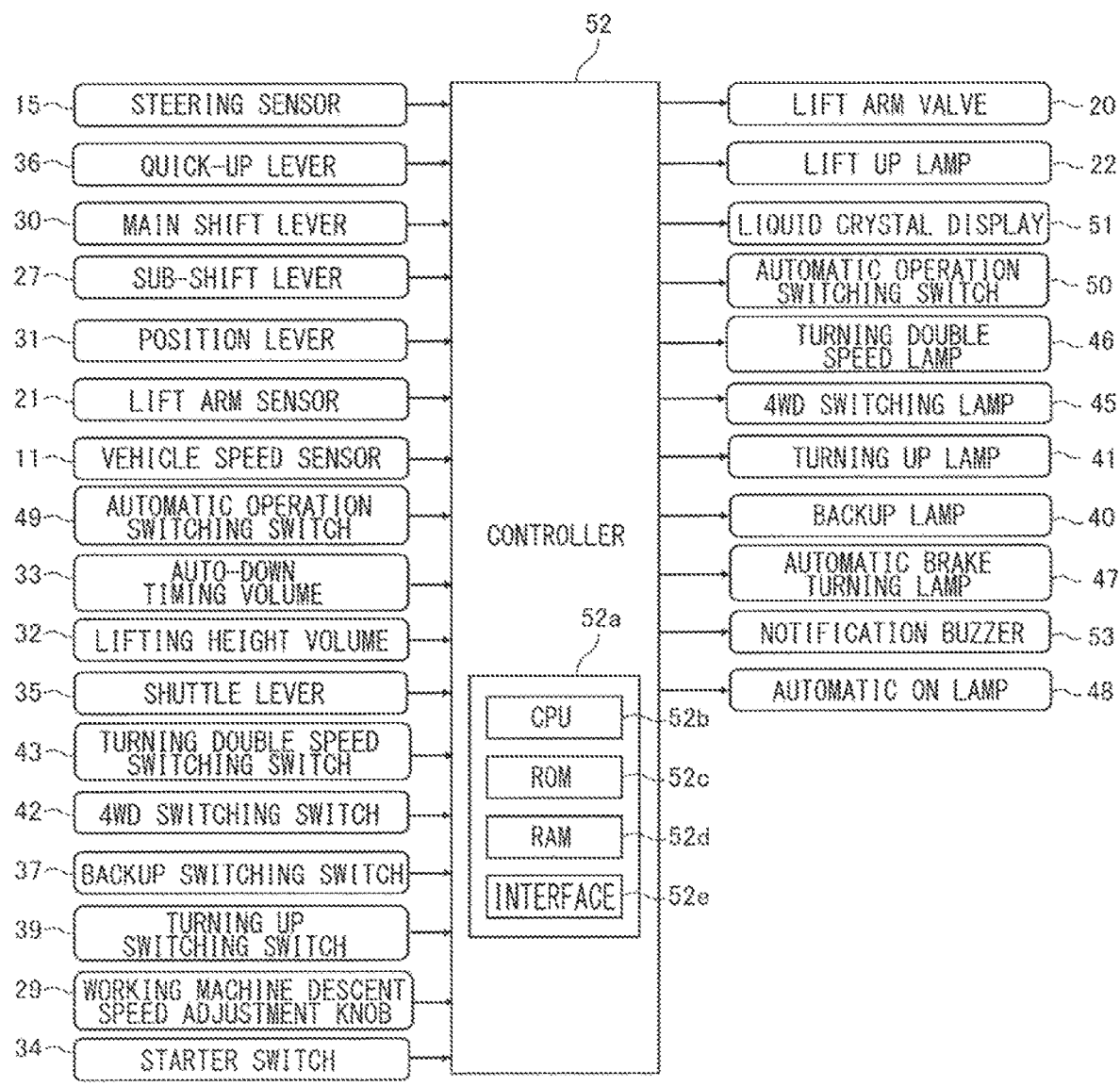
FIG. 7 is a block diagram of a controller.

The inside of the transmission case is filled with a lubricating oil, this lubricating oil is supplied to an unillustrated hydraulic pump that is driven by the driving force from the engine, and oil pressure generated by the hydraulic pump is transmitted to an unillustrated lift arm cylinder that lifts/lowers the rotary cultivator 3 by operation of a lift arm valve 20 illustrated in FIG. 7.

The driving force transmitted through the main transmission mechanism and the sub-transmission mechanism is distributed to the left and right rear wheels 6 by an unillustrated rear wheel driving shaft via an unillustrated rear wheel differential mechanism and distributed to the left and right front wheels 5 by an unillustrated front wheel driving shaft via an unillustrated front wheel differential mechanism, and the number of rotations of the inner wheel and the number of rotations of the outer wheel are allowed to be different when the traveling body 2 turns to the left or the right by steering the front wheels 5 such that smooth traveling is possible.

Figure 19:
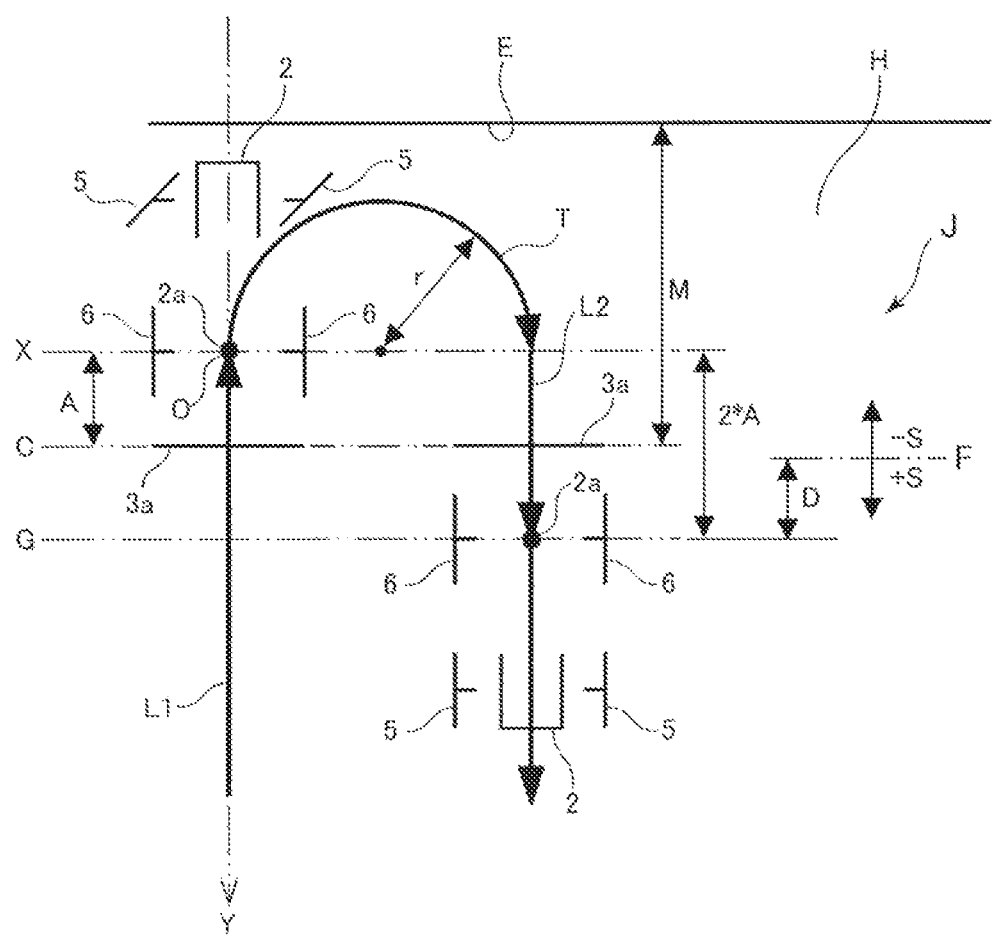
FIG. 19 is a schematic diagram illustrating a traveling path of a tractor.

The rear wheel differential mechanism transmits the driving force from the rear wheel driving shaft to the left and right rear wheels 6 via a pair of left and right unillustrated brake mechanisms capable of independently braking the left and right rear wheels 6. The numbers of rotations of the rear wheel driving shaft and one of the left and right rear wheels 6 per unit time are each independently detected by a vehicle speed sensor 11, and the vehicle speed of the traveling body 2 is calculated on the basis of the numbers of rotations of the rear wheel driving shaft and the one of the left and right rear wheels 6 per unit time. Here, as illustrated in FIG. 19, the vehicle speed is a movement distance per unit time of a body standard point 2a which is the center point between the left and right rear wheels 6 on the rotation shaft of the rear wheels 6. Information of the vehicle speed at the time when the vehicle speed is calculated is transmitted to the controller 52 by an electric signal. In addition, by integrating the vehicle speed over time by the controller 52, the movement distance of the body standard point 2a that is, the traveling distance of the traveling body 2 can be obtained.

The front wheel transmission mechanism includes an unillustrated hydraulic clutch of a multiple plate friction type, and the traveling body 2 is provided such that a front wheel double speed-ON 4WD mode in which front wheel double speed control of driving the left and right front wheels 5 at an average peripheral speed higher than the average peripheral speed of the left and right rear wheels 6, a front wheel double speed-OFF 4WD mode in which the left and right front wheels 5 are driven at an average peripheral speed approximately equal to the average peripheral speed of the left and right rear wheels 6, and a 2WD mode in which the driving force is not transmitted to the front wheels 5 can be switched by disconnecting the hydraulic clutch.

Steering Apparatus

The body frame 7 includes a steering apparatus 12 for steering the traveling body 2. The steering apparatus 12 includes a steering wheel 13 serving as a steering portion that the operator pivots to steer the front wheels 5, a steering column 14 illustrated in FIG. 6 that integrally pivots with the steering wheel 13, an unillustrated steering mechanism that extends in the left-tight direction and converts the pivot of the steering column 14 into an approximate linear motion in the left-right direction, and unillustrated tie rods that couple both ends of the steering mechanism to the left and tight front wheels 5. When the operator pivots the steering wheel 13, the steering column 14 pivots, the tie rods move in the left-right direction on the basis of the pivot angle and pivot direction of the steering column 14, and thus the left and right front wheels 5 are steered.

In the steering apparatus 12, an unillustrated stopper portion that regulates pivot of the steering wheel 13 by an angle equal to or larger than a predetermined angle in one direction is provided for each of left and right pivot directions. A maximum pivot angle $\alpha 1$ in one direction from a neutral position of the steering wheel 13 at which the traveling body 2 moves approximately straight is set to be approximately the same angle as the maximum pivot angle in the other direction. When the steering wheel 13 is pivoted from the neutral position by an angle equal to or larger than a predetermined angle $\alpha 2$ slightly smaller than the maximum pivot angle $\alpha 1$, a steering sensor 15 illustrated in FIG. 7 takes an ON state, and the steering wheel 13 being pivoted by α2 or more and the pivot direction of the steering wheel 13 are detected. In addition, when the pivot angle of the steering wheel 13 from the neutral position is smaller than α2, the steering sensor 15 takes an OFF state, and the pivot angle of the steering wheel 13 being smaller than α2 is detected. Information of the ON state or OFF state of the steeling sensor 15 and the pivot direction of the steering wheel 13 are transmitted to the controller 52 by an electric signal.

Lifting/Lowering Mechanism

A lifting/lowering link mechanism 16 serving as a lifting/lowering apparatus that couples the body frame 7 to the rotary cultivator 3 and lifts and lowers the rotary cultivator 3 is provided in a rear portion of the traveling body 2. The lifting/lowering link mechanism 16 includes an unillustrated link bracket provided to project from the rear portion of the traveling body 2, a top link 17 that is supported to be swingable in the up-down direction with respect to the link bracket and extends to the rear side, and a pair of left and right lower links 18 that are provided below the top link, are supported to be swingable in the up-down direction with respect to the link bracket, and extend to the rear side, and rear end portions of the top link 17 and the left and right lower links 18 are supported to be swingable in the up-down direction with respect to the rotary cultivator 3 to form a three-point link mechanism. The left and right lower links 18 are hanged by an unillustrated lift arm via unillustrated lift rods respectively provided on the left and the right. The front end of the lift arm is supported by the link bracket so as to be swingable in the up-down direction, the lower links 18 swing in the up-down direction in accordance with the swing of the lift arm in the up-down direction caused by expansion/contraction of a lift arm cylinder, and thus the rotary cultivator 3 ascends and descends. The swing angle of the lift arm is detected by a lift arm sensor 21 illustrated in FIG. 7 provided in the lift arm, and is transmitted to the controller 52 by an electric signal.

Driving Portion

Next, the driving portion 10 will be described with reference to FIG. 2. A sub-shift lever 27 that is swingably supported and is operated to shift gem of the sub-transmission mechanism is provided on the left side of the driver's seat 23, and a working machine descent speed adjustment knob 29 that is pivotably supported and capable of operating an unillustrated descent speed adjustment valve that adjusts the descent speed of the rotary cultivator 3 is provided below the driver's seat 23. The sub-shift lever 27 is provided to be operable to shift positions of 3 levels of a high speed level, a middle speed level, and a low speed level, the reduction ratio obtained by dividing the number of rotations of the engine by the number of rotations of the rear wheel driving shaft is the smallest among the 3 levels when the shift position of the sub-shift lever 27 is at the high speed level, the reduction ratio of the low speed level is the largest, and the reduction ratio of the middle speed level is between those of the high speed level and the low speed level. In addition, when the working machine descent speed adjustment knob 29 is pivoted clockwise by the operator, the descent speed adjustment valve is operated and thus the descent speed of the rotary cultivator 3 decreases, and when the working machine descent speed adjustment knob 29 is pivoted counterclockwise, the descent speed increases. Information of the shift position of the sub-shift lever 27 and information of the pivot position of the working machine descent speed adjustment knob 29 are transmitted to the controller 52 by an electric signal.

Side Panel

Figure 2:
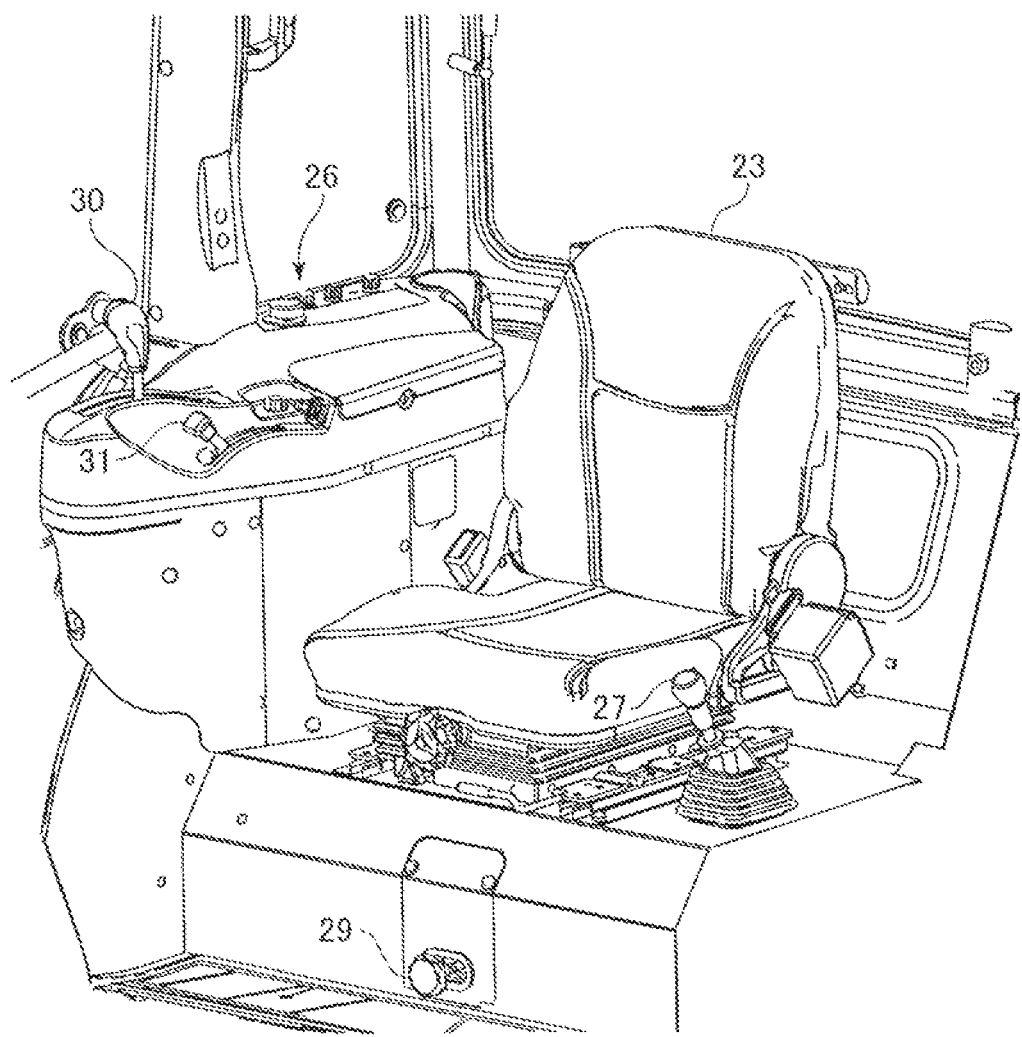
FIG. 2 is a perspective view of a rear portion of a driving portion.
Figure 3:
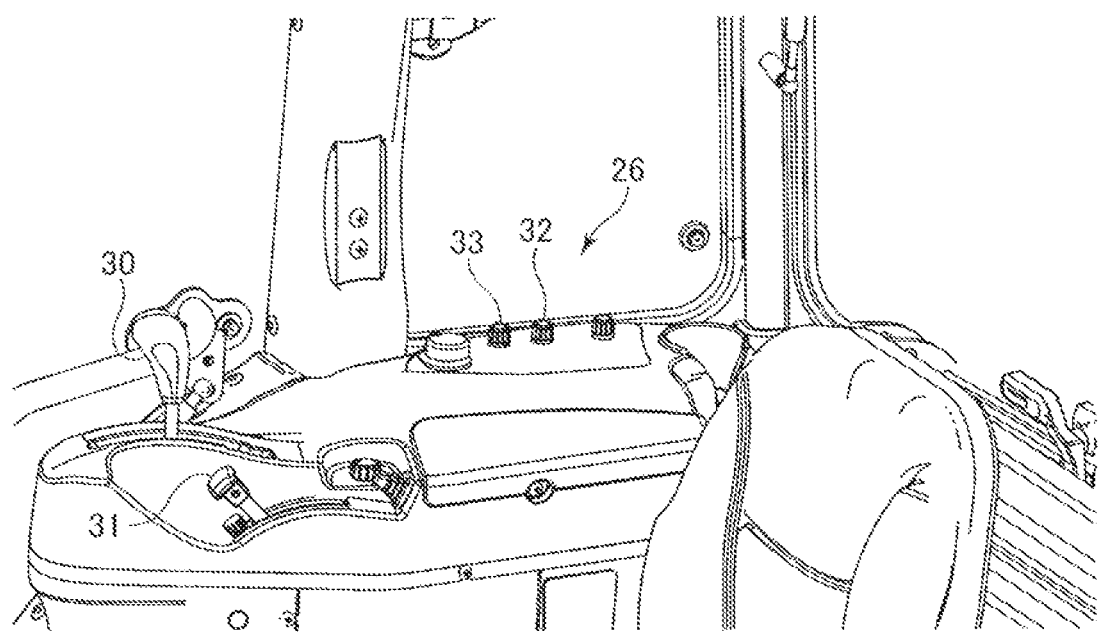
FIG. 3 is a perspective view of a side panel.
Figure 4:
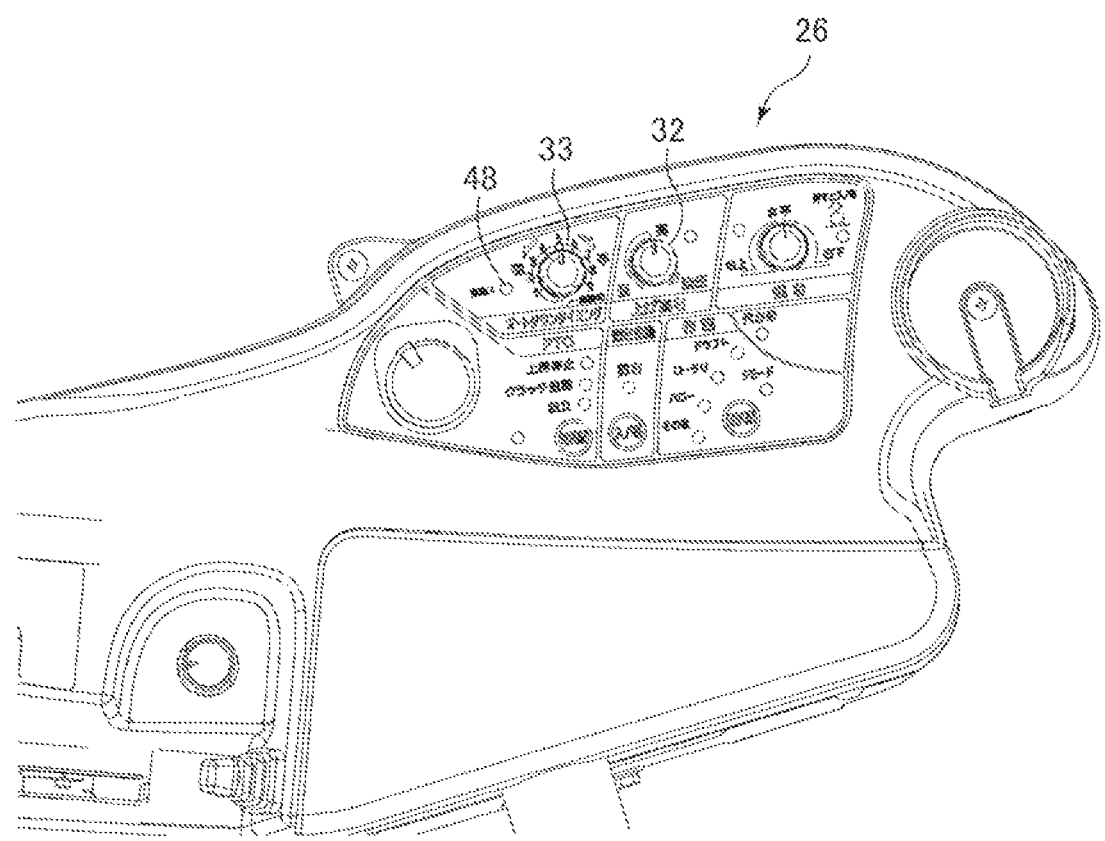
FIG. 4 is a plan view of the side panel.

As illustrated in FIGS. 2, 3, and 4, a side panel 26 in which various operation tools and lamps are disposed is provided on the right of the driver's seat 23. The side panel 26 includes a main shift lever 30 that is swingably supported and is operated to shift gears of the main transmission mechanism, a position lever 31 that is operated to lift and lower the rotary cultivator 3, a lifting height volume 32 that sets the maximum ascent height of the rotary cultivator 3, and an auto-down timing volume 33.

The gear shift operation of the main transmission mechanism by the main shift lever 30 can be performed independently from the gear shift operation of the sub-transmission mechanism performed by the sub-shift lever 27, and is provided to be operable among shift positions of 8 levels from an eighth level to a first level, a neutral position at which the driving force is not transmitted to the front wheels 5 and the rear wheels 6, and an accelerator shift position at which gear shift among the eighth level to the fourth level can be automatically performed by operation of an unillustrated accelerator pedal. The reduction ratio of the main transmission mechanism is the smallest at the eighth level, and the reduction ratio is configured to be larger as the level number becomes smaller. Information of the shift position of the main shift lever 30 is transmitted to the controller 52 by an electric signal.

The position lever 31 is supported to be swingable in the front-rear direction, and is configured such that the swing position thereof at the time when the operator handling the position lever 31 releases the position lever 31 is maintained. When the position lever 31 is operated to swing in the front-rear direction, the rotary cultivator 3 ascends or descends to a height corresponding to the position at which the position lever 31 is held. Information of the position at which the position lever 31 is held is transmitted to the controller 52 by an electric signal.

The lifting height volume 32 is pivotably supported, and is provided such that the pivot position thereof can be selected between a lifting height adjustment position provided and an oil pressure extraction position that are provided in a predetermined pivot range. When the pivot position of the lifting height volume 32 is at the lifting height adjustment position, the upper limit height of the ascent/descent of the rotary cultivator 3 increases in the case where the operator pivots the lifting height volume 32 clockwise, and the upper limit height decreases in the case where the operator pivots the lifting height volume 32 counterclockwise. When the pivot position of the lifting height volume 32 is at the oil pressure extraction position, oil pressure is transmitted from an unillustrated oil pressure extraction port to the traveling body 2, and thus the traveling body 2 takes, for example, a state in which a front loader or the like can be operated and in which the oil pressure to the lift cylinder is blocked and the rotary cultivator 3 does not ascend or descend. Information of the pivot position of the lifting height volume 32 is transmitted to the controller 52 by an electric signal.

The auto-down timing volume 33 is pivotably supported, and is provided to be changeable between an ON position and an OFF position that are provided in a predetermined pivot range. When the pivot position of the auto-down timing volume 33 is at the ON position, the descent start timing of the rotary cultivator 3 can be adjusted in accordance with the pivot position in auto-down control that will be described later. Information of the pivot position of the auto-down timing volume 33 is transmitted to the controller 52 by an electric signal. In addition, an automatic ON lamp 48 is provided in the side panel 26, and the automatic ON lamp 48 is turned off when the auto-down timing volume 33 is positioned at the OFF position, and is turned on or blinks in accordance with whether or not an auto-down permission condition that will be described later is satisfied when the auto-down timing volume 33 is positioned at the OFF position.

Around Steering Wheel

Figure 5:
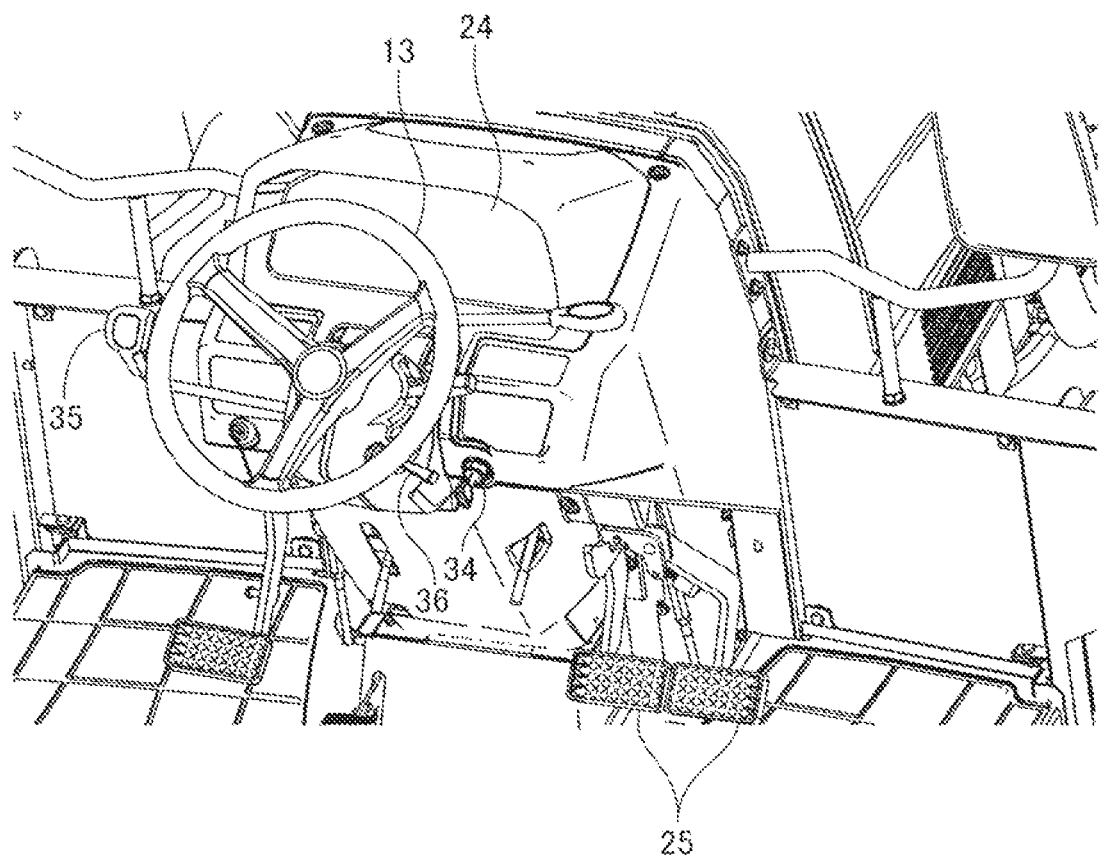
FIG. 5 is a perspective view of a front portion of the driving portion.

As illustrated in FIG. 5, the steering wheel 13 is disposed in front of the driver's seat 23, a brake pedal 25 that operates left and right brake mechanisms and an accelerator pedal are disposed below the steering wheel 13, and a starter switch 34 that is a main switch of the traveling body 2, a shuttle lever 35 serving as a forward/backward movement switching operation tool that is operated by the operator to switch forward movement and backward movement of the traveling body 2, and a quick-up lever 36 serving as an operation tool that is operated to lift and lower the rotary cultivator 3 between the upper limit height and the lower limit height that are preset are disposed around the steering wheel 13.

The shuttle lever 35 is provided to be operable to a forward movement position, a neutral position, and a backward movement position, the traveling body 2 moves forward when the shuttle lever 35 is positioned at the forward movement position, the traveling of the traveling body 2 is stopped when the shuttle lever 35 is positioned at the neutral position, and the traveling body 2 moves backward when the shuttle lever 35 is positioned at the backward movement position. Information of the operation position of the shuttle lever 35 is transmitted to the controller 52 by an electric signal.

The quick-up lever 36 is supported to be swingable among an upper position, a center position, and a lower position, and an unillustrated urging member is provided such that the quick-up lever 36 returns to the center position when the operator releases the hand operating the quick-up lever 36 after operating the quick-up lever 36 up to the upper position or down to the lower position. In a state in which the ascent/descent of the rotary cultivator 3 is stopped, the rotary cultivator 3 ascends to the upper limit height when the quick-up lever 36 is briefly moved up, and the rotary cultivator 3 descends to a height corresponding to the swing position of the position lever 31 serving as the lower limit height when the quick-up lever 36 is briefly moved down. The operation direction and operation time of the quick-up lever 36 are transmitted to the controller 52 by an electric signal. To be noted, the operation of briefly moving up refers to an operation of holding the quick-up lever 36 at the upper position serving as a first position for a period equal to or longer than a predetermined time t1 and shorter than t2 (t1<t2) and then moving the quick-up lever 36 to the center position serving as a second position. For example, the predetermined time t1 is set to 0.1 seconds, and t2 is set to 0.5 seconds. To be noted, although the operation of briefly moving up is set as an operation of moving up for a period equal to or longer than the predetermined time t1 and shorter than t2 for preventing erroneous operation in the present embodiment, the operation of briefly moving up may be set as an operation of moving up for a period shorter than t2.

Front Panel

Figure 6:
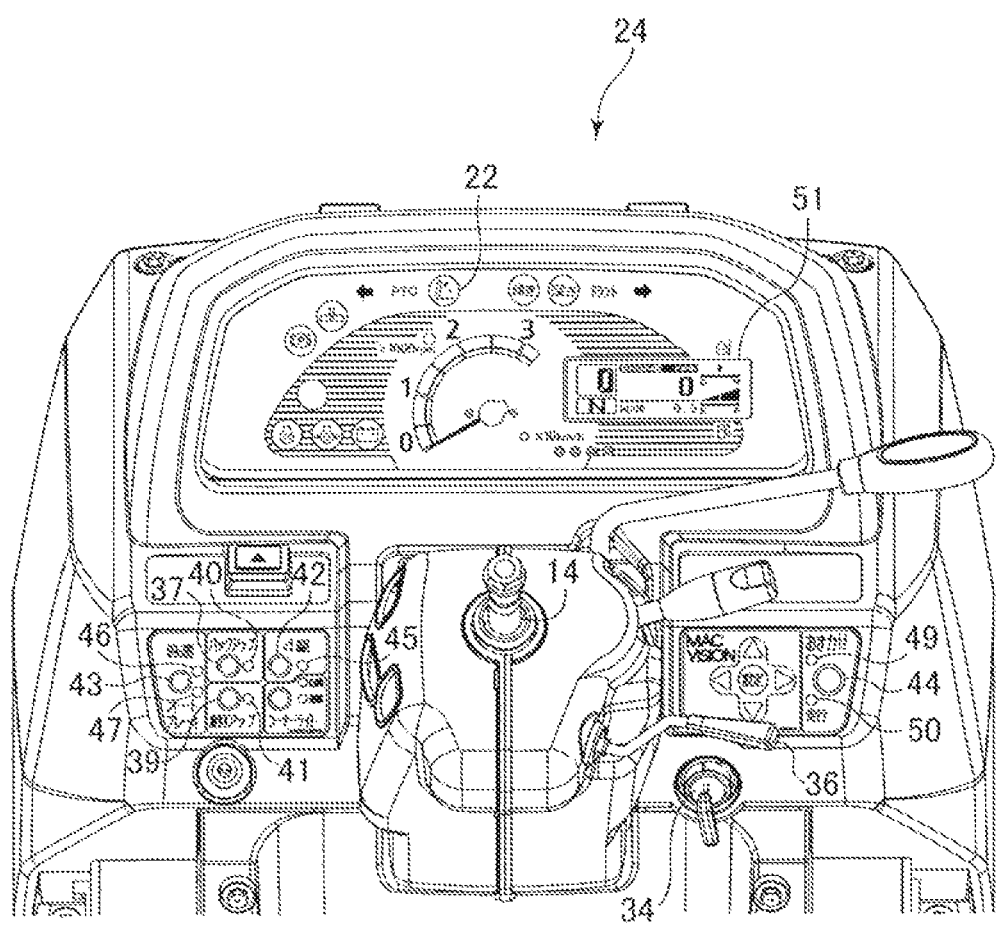
FIG. 6 is a perspective view of a front panel.

As illustrated in FIG. 6, a front panel 24 including various operation tools, a display apparatus, and lamps is disposed in front of the steering wheel 13. The front panel 24 includes a backup switching switch 37 that switches the ON state and the OFF state of a backup mode, and a turning up switching switch 39 that switches the ON state and the OFF state of a turning up mode, for the traveling body 2. In the case where the traveling body 2 is in the ON state of the backup mode, a backup lamp 40 is turned on, and the rotary cultivator 3 ascends to the upper limit height when a backward movement operation of switching the shuttle lever 35 (see FIG. 5) from the neutral position to the backward movement position is performed in a state in which the rotary cultivator 3 is not positioned at the upper limit height. In the case where the turning up mode is in the ON state, a turning up lamp 41 is turned on, and the rotary cultivator 3 ascends to the upper limit height when the steering sensor 15 is switched from the OFF state to the ON skate in a state in which the rotary cultivator 3 is not positioned at the upper limit height. Switching information of the backup switching switch 37 and the turning up switching switch 39 is transmitted to the controller 52 by an electric signal.

In addition, the front panel 24 includes a 4WD switching switch 42 that performs a disconnection operation of the hydraulic clutch, and a turning double speed switching switch 43 that performs the disconnection operation of the hydraulic clutch and a braking operation by the brake mechanism. The traveling body 2 is switched between each mode in which the driving force is transmitted to the front wheels 5 and the 2WD mode in which the driving force is not transmitted to the front wheels 5 each time the operator operates the 4WD switching switch 42, and in each mode in which the driving force is transmitted to the front wheels 5, a 4WD switching lamp 45 is on. Information of the switching operation by the 4WD switching switch 42 and the turning double speed switching switch 43 is transmitted to the controller 52 by an electric signal.

In a state in which the 4WD switching lamp 45 is on, the traveling body 2 is switched among the front wheel double speed-OFF 4WD mode, the front wheel double speed-ON 4WD mode, and the automatic brake mode each time the turning double speed switching switch 43 is operated. In the front wheel double speed-ON 4WD mode, a turning double speed lamp 46 is on, and in the automatic brake mode, front wheel double speed control is performed, automatic brake control in which the inner one of the rear wheels 6 in turning is automatically braked is performed by the controller 52, and an automatic brake turning lamp 47 is on.

The front panel 24 includes an automatic operation switching switch 49 capable of switching between a working mode for the traveling body 2 to perform a cultivation operation in a field and a traveling mode for the traveling body 2 to travel on a road or the like outside the field, and an automatic operation switching lamp 50 that displays whether the traveling body 2 is in the working mode or the traveling mode. The traveling body 2 is configured to be alternately switched between the working mode and the traveling mode each time the operator switches the automatic operation switching switch 49. When the traveling body 2 is switched from the working mode to the traveling mode, the backup mode and the turning up mode both take the OFF state, the front wheel double speed-ON 4WD mode or the automatic brake mode is switched to the front wheel double speed-OFF 4WD mode, the 2WD mode is maintained, the lifting/towering of the rotary cultivator 3 by the quick-up lever 36 is regulated, and in the case where the main shift lever 30 is positioned at the accelerator shift position, the gear shifting operation of the main transmission mechanism by the accelerator pedal becomes possible. When the traveling body 2 is switched from the traveling mode to the working mode, any one of the state of the backup mode, the turning up mode, the front wheel double speed-ON 4WD mode, the automatic brake mode, and the 2WD mode that has been taken before switching the working mode to the traveling mode is taken, the lifting/lowering of the rotary cultivator 3 by the quick-up lever 36 becomes possible, and the gear shifting operation of the main transmission mechanism by operating the accelerator pedal is regulated. Switching information of the working mode and the traveling mode by the automatic operation switching switch 49 is transmitted to the controller 52 by an electric signal.

Liquid Crystal Display

In addition, the front panel 24 includes a liquid crystal display apparatus 51 that displays various information related to the state of the traveling body 2 and the cultivation operation, and the liquid crystal display apparatus 51 serving as a display apparatus includes an auto-down state display portion 51a and a notification display portion 51e as illustrated in FIG. 18. The auto-down state display portion 51a displays a temperature/fuel indicator including an engine temperature indicator and an indicator of the amount of remaining fuel, information related to the auto-down control that will be described later, or the like, and the notification display portion 510 displays an engine rotation speed/use time indicator including an engine rotation speed indicator and a total use time indicator, notification sentence related to the auto-down control, or the like.

Block Diagram

FIG. 7 illustrates a control block diagram of the present embodiment, and the controller 52 capable of performing the auto-down control that will be described later includes a micro computer 52a including a CPU 52b, a ROM 52c, a RAM 52d, an interface 52e, and the like. The controller 52 outputs a signal by calculation of the micro computer 52a based on the signals input from the steering sensor 15, the lift arm sensor 21, the vehicle speed sensor 11, the quick-up lever 36, the main shift lever 30, the sub-shift lever 27, the position lever 31, the automatic operation switching switch 49, the auto-down timing volume 33, the lifting height volume 32, the shuttle lever 35, the turning double speed switching switch 43, the 4WD switching switch 42, the backup switching switch 37, the turning up switching switch 39, the working machine descent speed adjustment knob 29, and the starter switch 34 to operate the lift arm valve 20 and the notification buzzer 53, controls the ON/OFF of the lift up lamp 22, the automatic operation switching lamp 50, the turning double speed lamp 46, the 4WD switching lamp 45, the turning up lamp 41, the backup lamp 40, the automatic brake turning lamp 47, and the automatic ON lamp 48, and causes the liquid crystal display apparatus 51 to display various information.

Auto-Down Control

Next, the auto-down control serving as turning control performed by the controller 52 will be described with reference to flowcharts of FIGS. 8 to 17, contents of notification by the liquid crystal display apparatus 51 of FIG. 18, and the schematic diagram of FIG. 19 illustrating an example of a traveling path of the tractor 1 in a cultivation operation of a field H. That is, in the description below; only auto-down control performed when the tractor 1 turns right will be described, and description of the auto-down control performed when the tractor 1 turns left will be omitted. The auto-down control is control of, in the cultivation operation of the field H performed while the traveling body 2 travels back and forth by repetitively traveling forward and turning in a headland J, automatically starting the descent of the rotary cultivator 3 when a descent start line serving as a working machine descent start line is reached after the tractor 1 having reached the headland J lifts the rotary cultivator 3 and turns.

Main Routine

Figure 8:
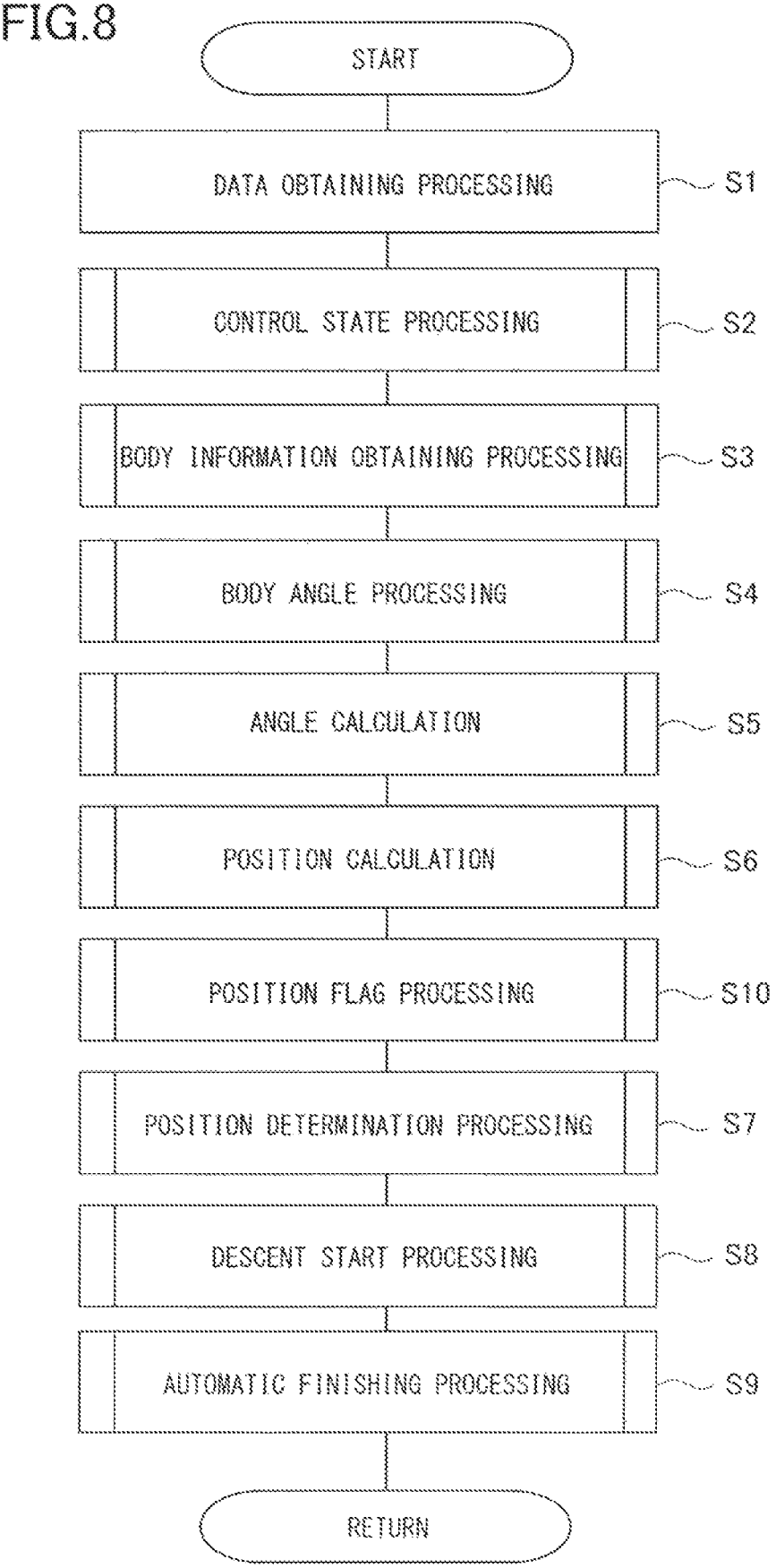
FIG. 8 is a flowchart of a main routine of auto-down control.

FIG. 8 is a flowchart illustrating a main routine of the auto-down control. The main routine is started when the operator switches the starter switch 34 to the ON state, and an auto-down cancellation state display screen including the temperature/fuel indicator of the auto-down state display portion 51a and the engine speed/use time indicator of the notification display portion 510 is displayed on the liquid crystal display apparatus 51 as illustrated in FIG. 18A. During execution of the main routine, data obtaining processing (step S1) to automatic finishing processing (step S9) are sequentially repeated until the starter switch 34 takes the OFF state. First, the operator measures an appropriate headland width M in the case of performing a cultivation operation while traveling back and forth in the field H in directions of a path L1 and a path L2 illustrated in FIG. 19. Specifically, for example, a mark that indicates the width of cultivation by the rotary cultivator 3 is put by traveling along a ridge edge E in a state in which the right edge or the left edge of the rotary cultivator 3 is close to the ridge edge E.

Next, the operator configures various settings as preparation for the cultivation operation. First, by setting the traveling body 2 to the working mode by operating the automatic operation switching switch 49, adjusting the pivot position of the Ming height volume 32 to the lifting height adjustment position, and then changing the pivot position of the auto-down timing volume 33 from the OFF position to the ON position, the controller 52 is switched from the auto-down OFF state to the auto-down ON state, and the automatic ON lamp 48 starts blinking. In addition, the operator operates the turning double speed switching switch 43 and the 4WD switching switch 42 to set the traveling body 2 to the front wheel double speed-ON 4WD mode or the automatic brake mode and shills the main shift lever 30 and the sub-shift lever 27 to cause the total reduction ratio determined by a combination of the transmission level of the main transmission mechanism and the transmission level of the sub-transmission mechanism to be larger than a predetermined auto-down reduction ratio, thereby an auto-down permission condition is satisfied, and the automatic ON lamp 48 is turned on. In addition, the operator operates the turning up switching switch 39 and the backup switching switch 37 to turn the turning up mode or the backup mode of the traveling body 2 on if necessary.

When the main routine is started, the controller 52 performs data obtaining processing of detecting whether or not a predetermined turning start operation has been performed or the like (step S1). Here, the turning start operation is switching of the shuttle lever 35 from the neutral position to the backward movement position in a state in which the backup mode is in the ON state and the rotary cultivator 3 is not positioned at the upper limit height, switching of the steering sensor 15 from the OFF state to the ON state in a state in which the turning up mode is in the ON state and the rotary cultivator 3 is not positioned at the upper limit height, and the operation of briefly moving up the quick-up lever 36 in a state in which the ascent/descent of the rotary cultivator 3 is stopped.

The operator aligns the direction of the traveling body 2 with the path L1 illustrated in FIG. 19, and performs the cultivation operation while causing the traveling body 2 to move straight yard the headland J along the path L1. When the traveling body 2 approaches the headland J, the operator continues the cultivation operation while visually recognizing the position of the rotary shaft 3a, and an auto-down start flag is set on in the case where any one of the turning start operations is performed when the rotary shall 3a readies an operation boundary C where the mark of the headland width M is put.

To be noted, in the present embodiment, although a path of L1, T, and L2 illustrated in FIG. 19 will be described, the traveling path at the time of turning in the headland J is not limited to this, and for example, the operator may pivot the steering wheel 13 clockwise by α2 or more and turn the traveling body 2 while causing the traveling body 2 to move backward to align the direction of the traveling body 2 to the path L2 in the ON state of the backup mode after the traveling body 2 reaches the ridge edge E. In addition, when the rotary shaft 3a reaches the operation boundary C in the headland J, the operator may align the orientation of the traveling body 2 with the path L2 by pivoting the steering wheel 13 counterclockwise by α2 or more to turn the traveling body 2 to the left by approximately 90° while causing the traveling body 2 to move forward, then causing the traveling body 2 to move straight backward to an appropriate position in a state in which the pivot angle of the steering wheel 13 is returned to the neutral position, and then turning the traveling body 2 to the left by 90° while causing the traveling body 2 to move forward in a state in which the steering wheel 13 is pivoted counterclockwise by α2 or more.

Control State Processing

Figure 9:
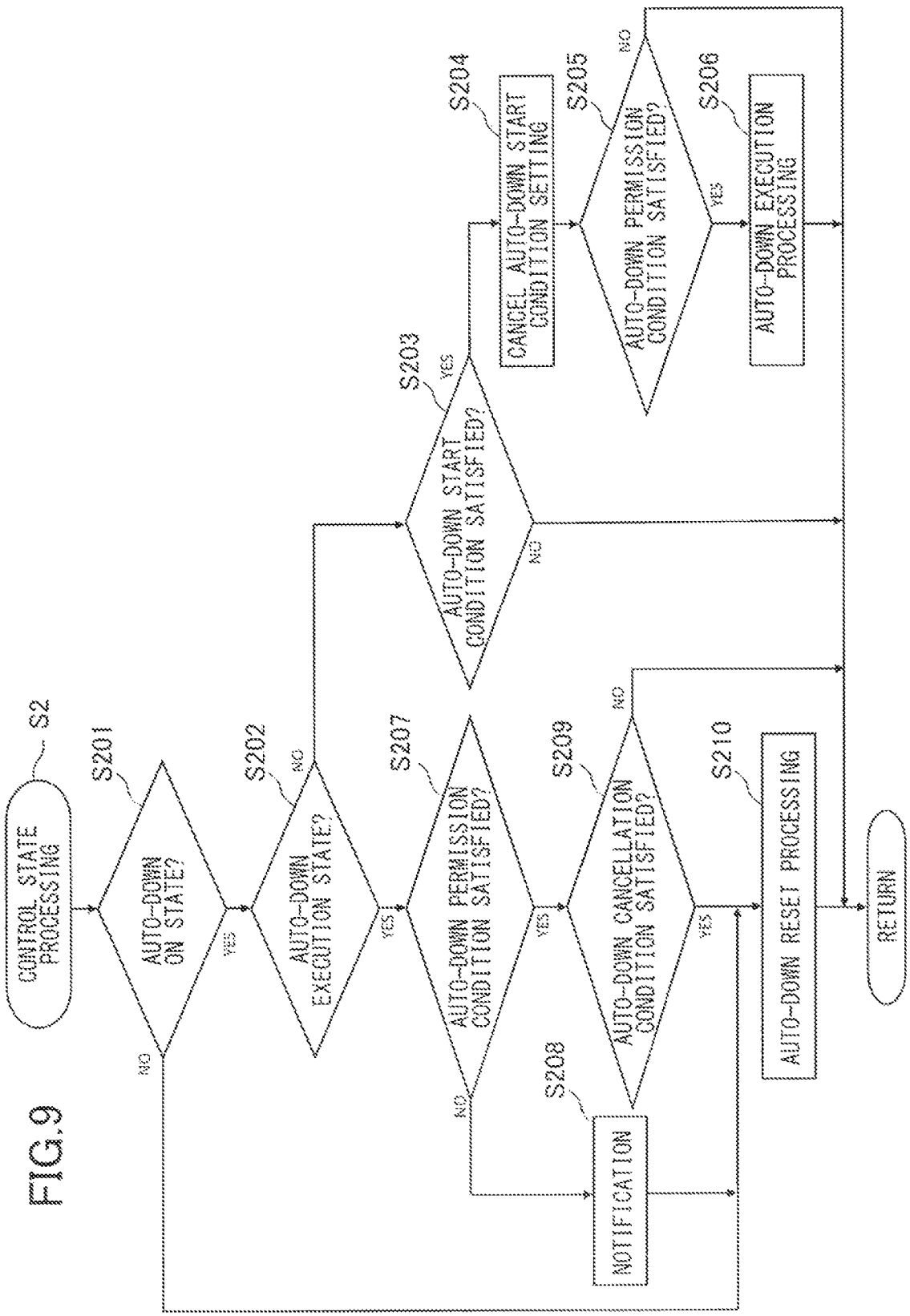
FIG. 9 is a flowchart of control state processing.

Next, the controller 52 performs control state processing (step S2) of determining whether or not to allow execution of processing of calculating the current position of the traveling body 2 and the descent start line. FIG. 9 illustrates a subroutine of the control state processing (step S2). When the control state processing (step S2) is started, first, the controller 52 determines whether or not the controller 52 is in the auto-down ON state (step S201).

When the controller 52 is in the auto-down ON state (YES in step S201), the controller 52 determines whether or not an auto-down execution flag is on (step S202). Here, the auto-down execution flag is a flag that is on when the controller 52 is in an auto-down execution state in which calculation and the like of the position of the turning traveling body 2 and the descent start line is performed, and a state in which the auto-down ON state is taken and the auto-down execution flag is off will be referred to as an auto-down cancellation state for the sake of convenience. When the auto-down execution flag is off in step S202), the controller 52 determines whether or not an auto-down start flag is on (step S203). That is, the controller 52 determines whether or not an auto-down start condition is satisfied. In addition, the auto-down execution state serving as an execution state is a state in which the auto-down control can be executed, and the auto-down cancellation state serving as a cancellation state is a state in which the auto-down control cannot be executed.

When the auto-down start flag is off in step S203 (NO in step S203), the controller 52 returns the process to the main routine, and when the auto-down start flag is on (YES in step S203), the controller 52 sets the auto-down start flag off (step S204), and determines whether or not an auto-down permission condition is satisfied (step S205).

When the auto-down permission condition is not satisfied (NO in step S205), the controller 52 returns the process to the main routine, and when the auto-down permission condition is satisfied (YES in step S205), the controller 52 sets the auto-down execution flag on and takes the auto-down execution state (step S206). In the auto-down execution state, the auto-down state display portion 51a displays a front-rear direction display portion 51b, a left-right direction display portion 51c, and a warning display portion 51d, the warning display portion 51d displays a warning sentence illustrated in FIG. 18B, and the front-rear direction display portion 51b and the left-right direction display portion 51c display a pattern illustrated in FIG. 18H. In addition, in the auto-down execution state, the notification buzzer 53 starts notification by a short sound repeated at an interval of a predetermined time t5. After such auto-down execution processing is performed, the controller 52 returns the process to the main routine. Here, the time when the state in which the auto-down execution flag is off is changed to the state in which the auto-down execution flag is on will be referred to as a turning start time. In addition, the front-rear direction display portion 51b and the kit-right direction display portion 51c display any one of the patterns illustrated in FIG. 18H to (p) on the basis of results of body information obtaining processing (step S3) to position flag processing (step S10) that will be described later. That is, the left-right direction display portion 51c serving as a first display portion instructs the operation direction of the steering wheel 13 such that the traveling body 2 readies the descent start line, and the front-rear direction display portion 51b serving as a second display portion displays the positional relationship between the coordinates of the traveling body 2 and the descent start line in a vertical Y-axis direction.

When the auto-down execution flag is on in step S202 (YES in step S202), the controller 52 determines whether or not the auto-down permission condition is satisfied (step S207). When the auto-down permission condition is not satisfied (NO in step S207), that is, when an operation that makes the auto-down permission condition not satisfied for some reason is performed while the traveling body 2 has once been performing turning or the cultivation operation in the auto-down execution state, the controller 52 notifies the operator that the auto-down permission condition is not satisfied by blinking the automatic ON lamp 48 (step S208), sets both the auto-down execution flag and the auto-down start flag off as auto-down reset processing (step S210), and takes the auto-down cancellation state. Examples of this include a case where, in response to completion of the cultivation operation, the operator operates the automatic operation switching switch 49 to switch the traveling body 2 from the working mode to the traveling mode.

When the auto-down permission condition is satisfied in step S207 (YES in step S207), the controller 52 determines whether or not an auto-down cancellation flag is on (step S209). The auto-down cancellation flag is a flag that is set on when an auto-down cancellation condition that will be described later is satisfied in automatic finishing processing (step S9) or the like. When the auto-down cancellation flag is off (NO in step S209), the controller 52 returns the process to the main routine. When the auto-down OFF state is taken in step S201 (NO in step S201) or when the auto-down cancellation flag is on in step S209 (YES in step S209), the controller 52 sets both the auto-down execution flag and the auto-down start flag off, cancels the auto-down execution state to take the auto-down cancellation state as the auto-down reset processing (step S210), and returns the process to the main routine.

Body Information Obtaining Processing

Figure 10:
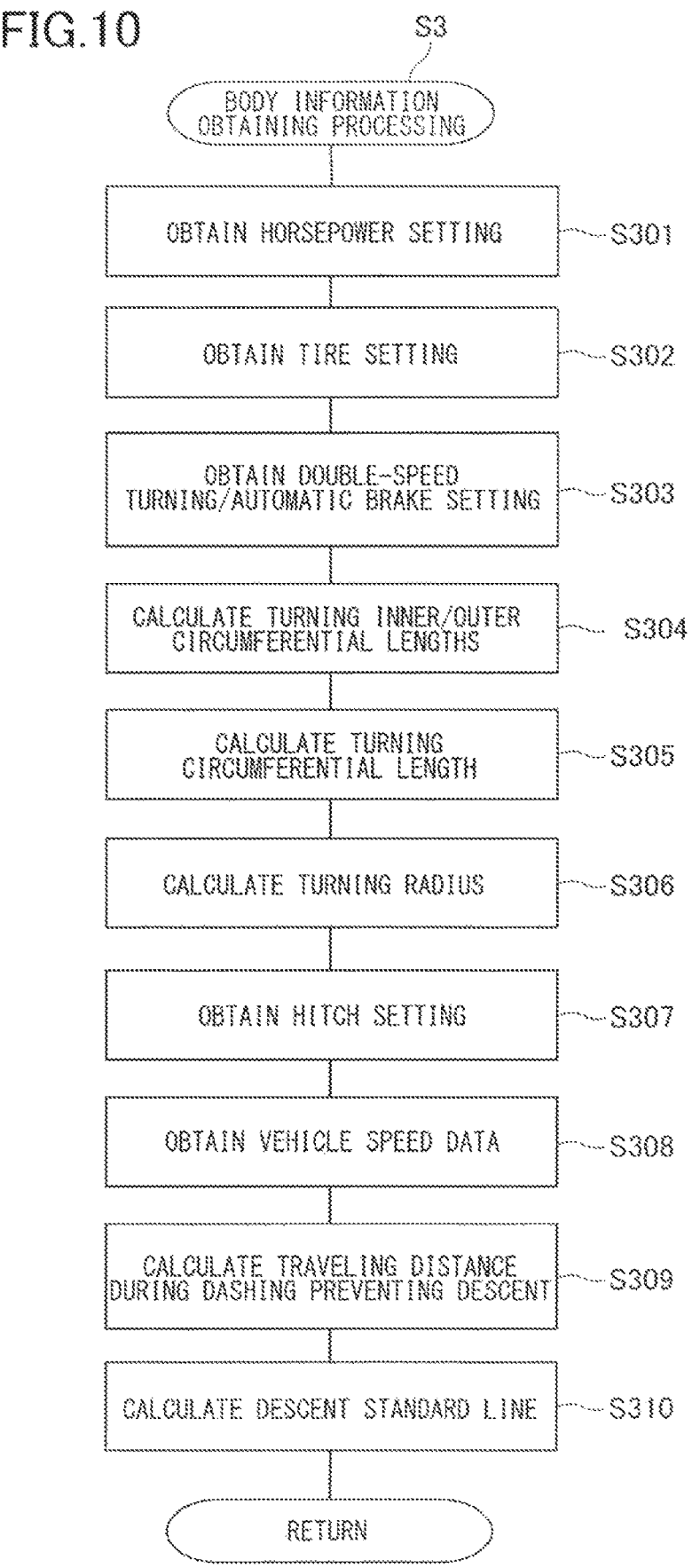
FIG. 10 is a flowchart of body information obtaining processing.

FIG. 10 illustrates a subroutine of body information obtaining processing (step S3) of loading information such as the type and settings of the tractor and calculating a descent standard line F serving as a standard for determining the descent start line on the basis of the position of the traveling body 2 at the start of the turning. After the body information obtaining processing is started, the controller 52 loads the maximum output of the engine that is stored in advance in the controller 52 as acquisition of a horsepower setting (step S301) and loads the type and dimensions of the traveling apparatus including the front wheels 5, the rear wheels 6, and so forth as acquisition of a tire setting (step S302). Examples of the type of the traveling apparatus include a pair of front wheels 5 and a pair of rear wheels 6, a pair of front wheels 5 and a pair of crawlers, and only a pair of crawlers, and examples of the dimensions of the traveling apparatus include the length of a crawler, the inter-shall distance between the front wheels 5 and the rear wheels 6, and the distances between the left and right front wheels 5 and the left and right rear wheels 6. Therefore, the traveling apparatus may be a combination of the front wheels 5 and crawlers or only the crawlers. Next, the controller 52 loads which of the front wheel double speed-OFF 4WD mode, the front wheel double speed-ON 4WD mode, and the automatic brake mode the traveling body 2 is on (step S303).

The controller 52 stores turning inner circumferential lengths and turning outer circumferential lengths corresponding to various combinations of results of step S301, step S302, and step S303 in advance, and the controller 52 calculates the turning inner circumferential length and the turning outer circumferential length corresponding to the combination of the results described above (step S304). Here, the turning inner circumferential length and the turning outer circumferential length are movement distances of the rear wheels 6 on the inner side and the outer side of the turning in the case where the traveling body 2 turns by 360° in a state in which the steering wheel 13 has been pivoted to the maximum pivot angle to the left or the right.

Next, the controller 52 calculates, on the basis of the turning inner circumferential length, and the turning outer circumferential length loaded in step S304, a turning circumferential length that is an average value of the turning inner circumferential length and the turning outer circumferential length (step S305), and calculates a turning radius r on the basis of this turning circumferential length (step S306). The turning radius r is a radius of an arcuate trajectory drawn by the body standard point 2a in the case where the traveling body 2 is turned in a state in which the steering wheel 13 is pivoted to the maximum pivot angle to the left or the right, and is calculated by dividing the turning circumferential length by a double of pi.

Next, the controller 52 loads a hitch length A (see FIG. 19) that is the distance between the rotation shaft of the rear wheels 6 and the rotary shaft 3a of the rotary 3b in plan view when the rotary 3b is on the ground and is stored in the controller 52 in advance (step S307), and loads the vehicle speed measured by the vehicle speed sensor 11 (step S308). Further, the controller 52 loads a dashing height, the pivot position of the lifting heist volume 32, and the pivot position of the working machine descent speed adjustment knob 29, and calculates, on the basis of the vehicle speed, a descent traveling distance D (see FIG. 19) by which the body standard point 2a moves in a period from the start of descent to landing of the rotary cultivator 3 (step S309). Here, the dashing height is a height serving as a point of change of a preset descent speed when reducing the descent speed for soft landing after the rotary cultivator 3 descends to a predetermined height such that the traveling body 2 is not suddenly accelerated by the rotational force of the rotary 3b when the rotary 3b is landed while rotating.

As illustrated in FIG. 19, the controller 52 sets, in plan view, a two-dimensional cartesian coordinate system having the position of the body standard point 2a at the start of turning, that is, the turning start position as the origin O, the rotation shaft of the rear wheels 6 at this time as a horizontal axis X, and a vertical axis Y which is perpendicular to the horizontal axis X and passes through the origin O and for which the rear side of the traveling body 2 at the start of turning serves as the plus side. To be noted, the horizontal axis X extends parallel to the left-right direction of the traveling body 2 at the start of the turning, and the vertical axis Y extends parallel to the front-rear direction of the traveling body 2 at the start of the turning. Further, the controller 52 sets, on the basis of the results of step S307 to step S309 performed by body information obtaining processing (step S3), the descent standard line F defined only by the Y coordinate and serving as a standard for calculating the descent start line in the coordinate system (step S310). In addition, the position of the traveling body 2 in the coordinate system is specified by the X coordinate in the horizontal axis X direction and the Y coordinate in the vertical axis Y direction of the body standard point 2a.

The cultivation operation can be performed while making the headland width M from the ridge edge E constant in the case where the rotary cultivator 3 is landed and the cultivation operation is resumed at such a position that the position of the rotary shaft 3a of the rotary cultivator 3 that has landed after the turning coincides with the operation boundary C that is the position of the rotary shaft 3a of the rotary cultivator 3 in the landed state at the start of the turning, that is, at an operation resume position G at which the Y coordinate of the body standard point 2a is equal to the double of the hitch length A in a state in which the direction of the traveling body 2 at the start of the turning is opposite to the direction of the traveling body 2 after the turning. In the case where the descent is started at a position in the descent traveling distance D to the operation resume position G while the traveling body 2 is traveling along the path L2, the cultivation operation can be resumed at the operation resume position G without stopping the traveling of the traveling body 2 when the traveling body 2 turns in the headland J. A Y coordinate obtained by subtracting the descent traveling distance D from the Y coordinate of the operation resume position serves as the Y coordinate of the descent standard line F. After calculating the descent standard line F, the controller 52 returns the process to the main routine. In addition, the operator can set a descent setting line obtained by adjusting the Y coordinate of the position at which the descent of the rotary cultivator 3 is started within a range from the minimum of −S to the maximum of +S with respect to the descent standard line F by operating the auto-down timing volume 33.

Body Angle Processing

Figure 11:
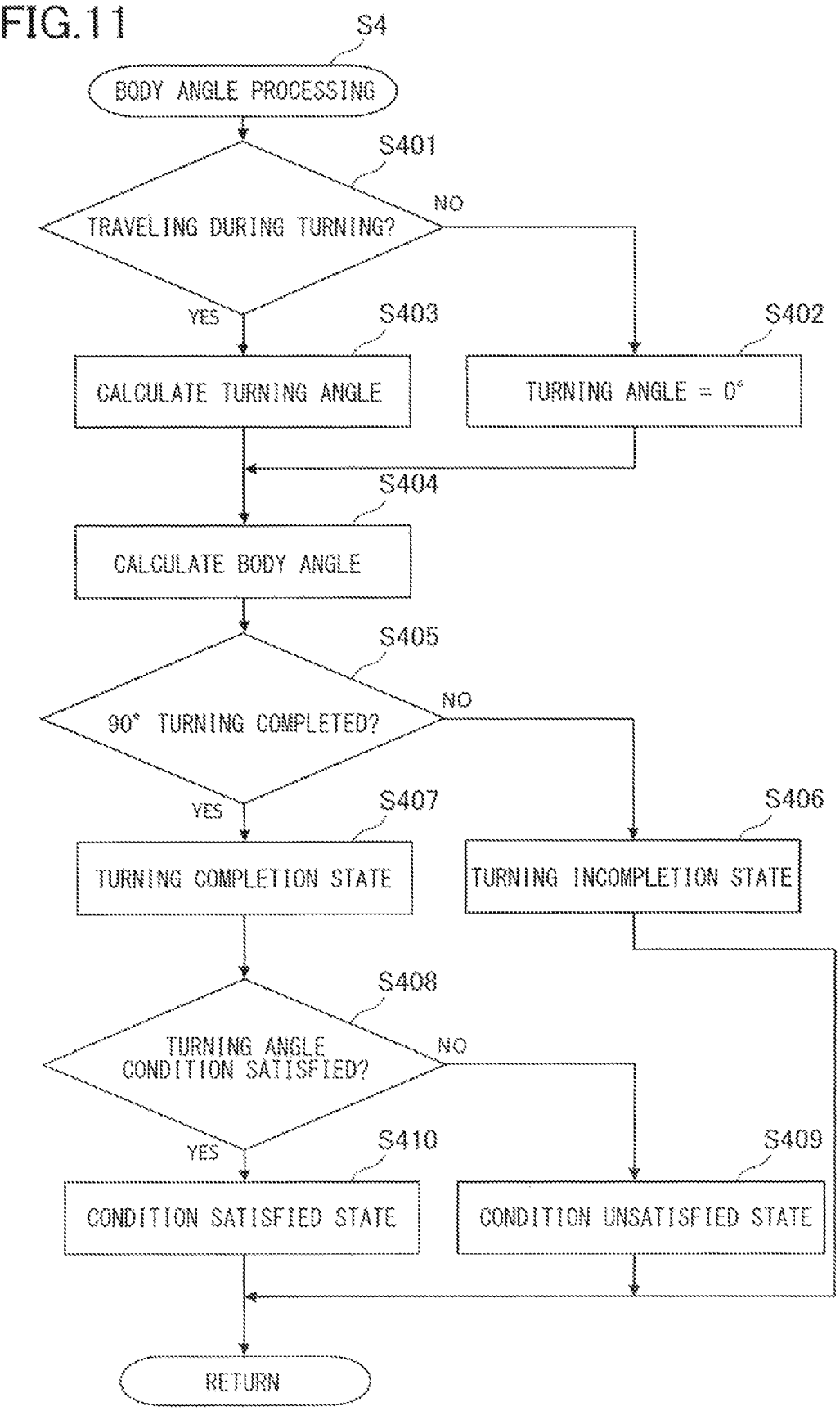
FIG. 11 is a flowchart of body angle processing.

FIG. 11 illustrates a subroutine of body angle processing (step S4) of calculating a change in the direction of the traveling body 2 in the auto-down execution state and determining completion of the turning on the basis of the results of calculation. First, the controller 52 determines whether or not traveling during turning is performed (step S401). The traveling during turning is a state in which conditions that the auto-down execution flag is on, the vehicle speed of the traveling body 2 is not 0, and the steering sensor 15 is in the ON state are all satisfied. In the case where it is determined that traveling during turning is performed (YES in step S401), the controller 52 calculates, on the basis of the vehicle speed and the turning radius r, the change in the direction of the traveling body 2, that is, the amount of angle change, in an infinitesimal time dt (step S403). Then, the controller 52 accumulates the calculated amount of angle change to calculate a body angle that is an angle formed by the direction of the traveling body 2 at the start of the turning and the direction of the traveling body 2 at the time of the calculation (step S404). In the case where it is determined that traveling during turning is not performed in step S401, (NO in step S401), the amount of angle change is set to 0 (step S402), and the body angle is calculated (step S404).

When any one of the turning start operations is performed by the operator, transmission of the driving force from the PTO shaft to the rotary cultivator 3 is blocked and the rotary cultivator 3 ascends to the upper limit height, and in the case where the auto-down on state is taken and the auto-down start condition and the auto-down permission condition are all satisfied, the auto-down execution state is taken, and calculation of the position and direction of the traveling body 2 in the field H is started. At this time, the notification buzzer 53 starts notification by a short sound repeated at an interval of the predetermined time t5, the warning display portion 51d displays "AUTODOWN/DESCENDING!" that is an auto-down caution screen illustrated in FIG. 18B, and the front-rear direction display portion 51b and the left-right direction display portion 51c displays the pattern of FIG. 18H. The operator causes the traveling body 2 to travel along an arcuate path T having a radius equal to the turning radius r by pivoting the steering wheel 13 clockwise to the maximum pivot angle.

Next, the controller 52 determines whether or not the body angle is equal to or larger than 90° (step S405), and in the case where the body angle is smaller than 90° (NO in step S405), the controller 52 determines that a turning incompletion state is taken (step S406). More specifically, the controller 52 causes the front-rear direction display portion 51b and the left-right direction display portion 51c to display a pattern illustrated in FIG. 18H in the case where the body angle is smaller than 20°, causes the front-rear direction display portion 51b and the left-right direction display portion 51c to display a pattern illustrated in FIG. 18I in the case where the body angle is equal to or larger than 20° and smaller than 90°, and returns the process to the main routine. In the left-right direction display portion 51c, three display portions 51i having rectangular shapes that can be switched between a non-display state in which only the outline is displayed and a display state in which the inside of the outline is filled with the same color as the outline are arranged in the left-right direction on each of the left side and the right side of the front-rear direction display portion 51b. Any one of the three display portions 51i on the right side being in the display state indicates that the traveling body 2 can be closer to the descent start line by causing the traveling body 2 to travel in a state which the operator has pivoted the steering wheel 13 clockwise. Any one of the three display portions 51i on the left side being in the display state indicates that the traveling body 2 can be closer to the descent start line by causing the traveling body 2 to travel in a state which the operator has pivoted the steering wheel 13 counterclockwise. In addition, the pattern displayed in the front-rear direction display portion 51b being oriental as illustrated in FIG. 18H indicates that the descent start line is behind the traveling body 2, and the pattern displayed in the front-rear direction display portion 51b being oriented as illustrated in FIG. 18P indicates that the descent start line is in front of the traveling body 2. The operator continues the turning of the traveling body 2 along the path T while looking at the front-rear direction display portion 51b and the left-right direction display portion 51c and maintaining the state in which the steering wheel 13 is pivoted clockwise to the maximum pivot angle.

In the case where the body angle is equal to or larger than 90° in step S405 (YES in step S405), the controller 52 determines that a turning completion state is taken (step S407), and determines whether or not a turning angle condition is satisfied (step S408). Satisfaction of the turning angle condition refers to the body angle being within a predetermined turning completion angle range in which it is determined that the turning is completed. Using predetermined angles $\alpha3$ and $\alpha4$ satisfying $\alpha3<\alpha4$ for the turning completion angle range, the turning completion angle range is $180°\pm\alpha4$ after the body angle has changed from out of a range of $180°\pm\alpha3$ to in the range of $180°\pm\alpha3$, and the turning completion angle range is $180°\pm\alpha3$ after the body angle has changed from in the range of $180°\pm\alpha4$ to out of the range of $180°\pm\alpha4$. In this manner, by changing the turning completion angle range in accordance with whether or not the body angle is within the turning completion angle range, processing being switched frequently is prevented even in the case where, for example, the traveling body 2 goes a little off course when the body angle is near the upper limit or the lower limit of the turning completion angle range.

When the turning angle condition is not satisfied in step S408 (NO in step S408), the controller 52 causes the front-rear direction display portion 51b and the left-right direction display portion 51c to display a pattern illustrated in FIG. 18J in the case where the body angle is equal to or larger than 90° and smaller than the turning completion angle range, causes the front-rear direction display portion 51b and the left-right direction display portion 51c to display a pattern illustrated in FIG. 18M in the case where the body angle is larger than the turning completion angle range and is equal to or smaller than 270°, causes the front-rear direction display portion 51b and the left-right direction display portion 51c to display a pattern illustrated in FIG. 18N in the case where the body angle is larger than 270° and smaller than 300°, sets a turning angle condition flag off (step S409), and returns the process to the main routine.

When the turning angle condition is satisfied in step S408 (YES in step S408), the controller 52 notifies the operator in advance that the descent start line is soon to be reached by causing a pattern illustrated in FIG. 18P in which the front-rear direction display portion 51b and the display portions 51i adjacent to the front-rear direction display portion 51b on the left side and the tight side are all in the display state to be displayed and changing the interval of the short sound from the notification buzzer 53 to a predetermined time t6 shorter than t5 in the case where the coordinates of the body standard point 2a in the coordinate system at the time of calculation, that is, the Y coordinate of the current position is within a predetermined distance in a negative direction from the descent start line, causes the front-rear direction display portion 51b and the left-right direction display portion 51c to display a pattern illustrated in FIG. 18K and sets the turning angle condition on (step S410) in other cases, and returns the process to the main routine.

The operator recognizes that the pattern illustrated in FIG. 18K is displayed in the left-right direction display portion 51c, returns the steering wheel 13 to the neutral position, and causes the traveling body 2 to travel straight along the path L2 parallel to the path L1 until the pattern illustrated in FIG. 18P is displayed in the left-right direction display portion 51c.

Angle Calculation

Figure 12:
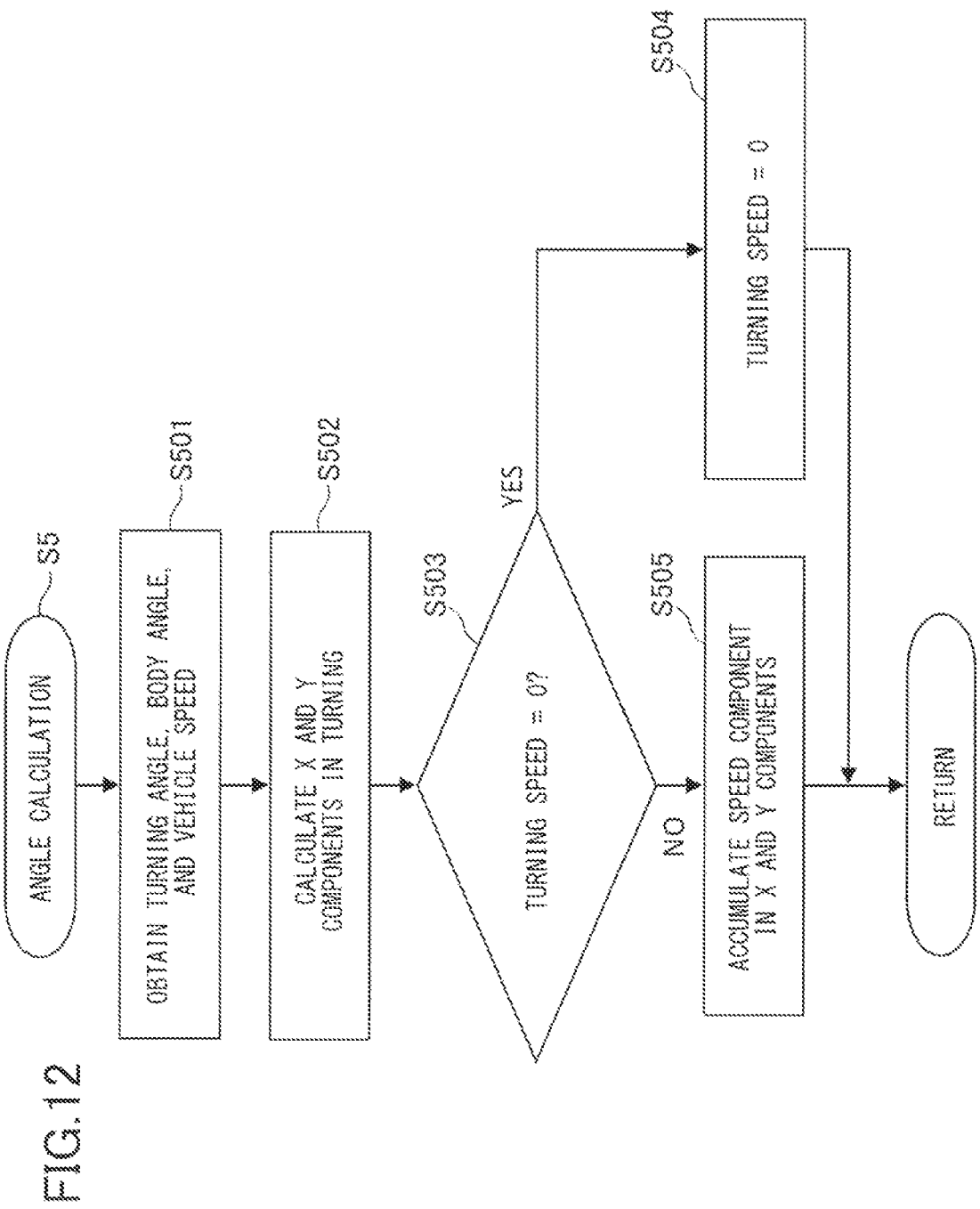
FIG. 12 is a flowchart of angle calculation.

FIG. 12. illustrates a subroutine of angle calculation (step S5) in which the current position is calculated on the basis of the body angle. First, the controller 52 loads the amount of angle Change (that is, the turning angle), the body angle, and the vehicle speed (step S501), and calculates the change in the position of the traveling body 2 in the coordinate system in an infinitesimal time dt, that is, the amount of change in the coordinates, on the basis of the amount of angle change, the body angle, and the vehicle speed (step S502). Next, the controller 52 determines whether or not the vehicle speed of the traveling body 2 is 0 (step S503), maintains the current position (step S504) and returns the process to the main routine in the case where the vehicle speed (that is, the turning speed) is 0 (YES in step S503), calculates a new current position by accumulating the amount of change in the coordinates in the current position (step S505) and returns the process to the main routine in the case where the vehicle speed is not 0 (NO in step S503).

Position Calculation

Figure 13:
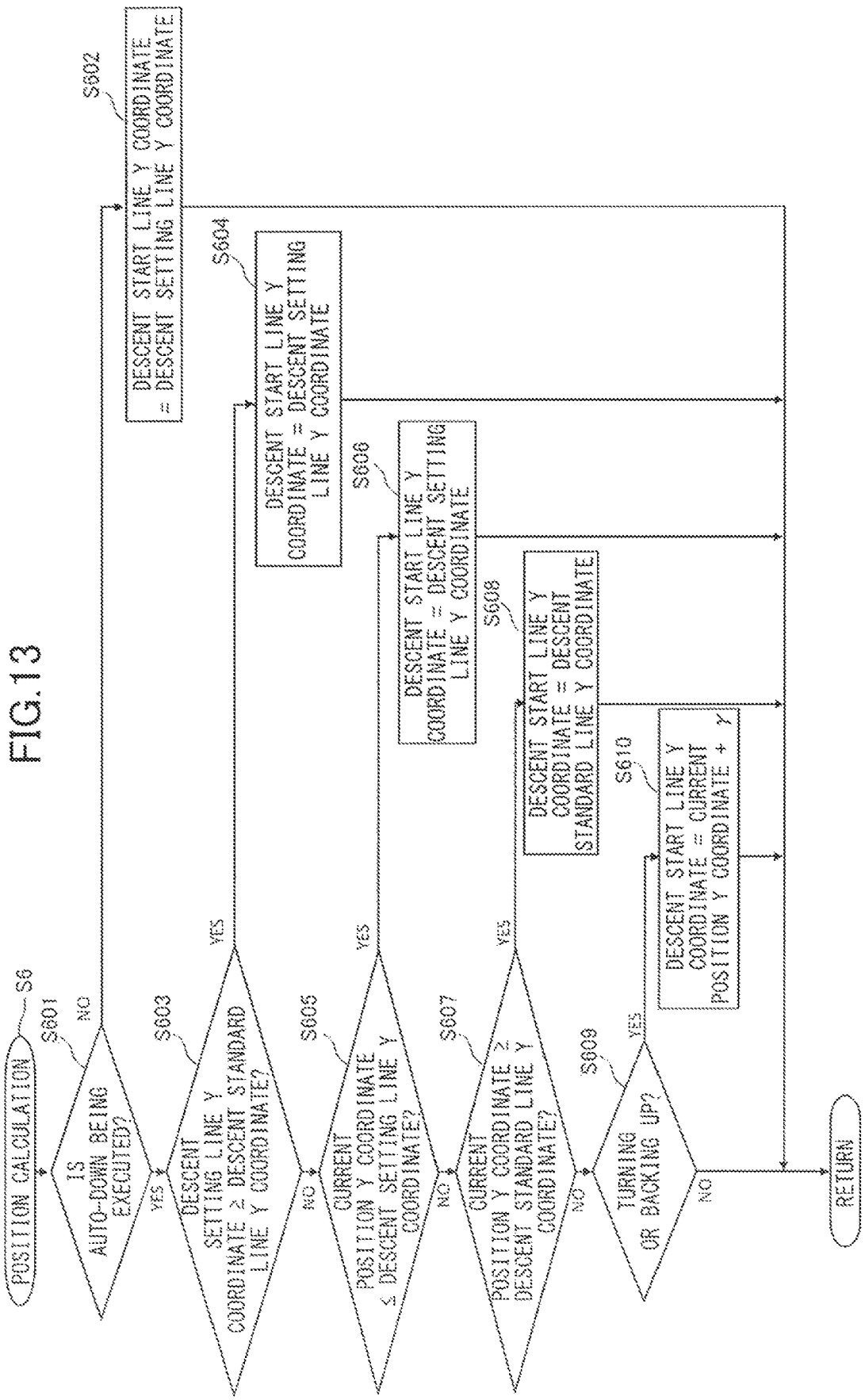
FIG. 13 is a flowchart of position calculation.

FIG. 13 illustrates a subroutine of position calculation (step S6) in which the descent start line is calculated on the basis of the descent standard line F, the current position, and the descent setting line. First, the controller 52 determines whether or not the auto-down execution state is taken (step S601), and in the case where the auto-down execution state is not taken (NO in step S601), employs the descent setting line as the descent start line (step S602), and returns the process to the main routine. Here, the descent start line is a variant defined only by the Y coordinate, and is a straight line which changes in accordance with the results of calculation based on the descent standard line F, the descent setting line, the current position, the body angle, and the path of the traveling body 2 in the position calculation (step S6) and position determination processing (step S7) that will be described in detail later, and the descent of the rotary cultivator 3 is started when the current position reaches the descent start line. In the case where the auto-down execution state is taken (YES in step S601), the controller 52 employs the Y coordinate of the descent setting line as the Y coordinate of the descent start line (step S606) and returns the process to the main routine when the Y coordinate of the descent setting line is equal to or larger than the Y coordinate of the descent standard line F (YES in step S603) and when the Y coordinate of the descent setting line is equal to or larger than the Y coordinate of the current position and smaller than the Y coordinate of the descent standard line F (YES in step S605).

In the case where the auto-down execution state is taken and when the Y coordinate of the descent standard line F is larger than the Y coordinate of the descent setting line and equal to or smaller than the Y coordinate of the current position (YES in step S607), the controller 52 employs the Y coordinate of the descent standard line F as the Y coordinate of the descent start line (step S608), and returns the process to the main routine. In the case where the auto-down execution state is taken and when the Y coordinate of the current position is larger than the Y coordinate of the descent setting line and smaller than the Y coordinate of the descent standard line F (NO in step S607), the controller 52 determines whether or not the steering sensor 15 is in the ON state or the shuttle lever 35 is positioned in the backward movement position (step S609). When the steering sensor 15 is in the ON state or the shuttle lever 35 is positioned at the backward movement position (YES in step S609), the controller 52 employs a value obtained by adding a predetermined hysteresis value γ to the Y coordinate of the current position as the Y coordinate of the descent start line (step S610), and returns the process to the main routine. In the case where neither the steering sensor 15 is in the ON state nor the shuttle lever 35 is positioned in the backward movement position in step S609 (NO in step S609), the process is returned to the main routine. As described above, in the auto-down execution state, a state in which the descent start line is set while changing the Y coordinate of the descent start line in accordance with the change in the Y coordinates of the current position and the descent setting line is maintained.

The operator causes the traveling body 2 to travel forward while moving straight along the path L2, recognizes that the Y coordinate of the current position as reached a position within the predetermined distance β to the descent start line, the pattern illustrated in FIG. 18P is displayed in the front-rear direction display portion 51b and the left-right direction display portion 51c, and the interval of the short sound from the notification buzzer 53 has become shorter, and thus recognizes that the start of the descent of the rotary cultivator 3 is near.

Position Flag Processing

Figure 14:
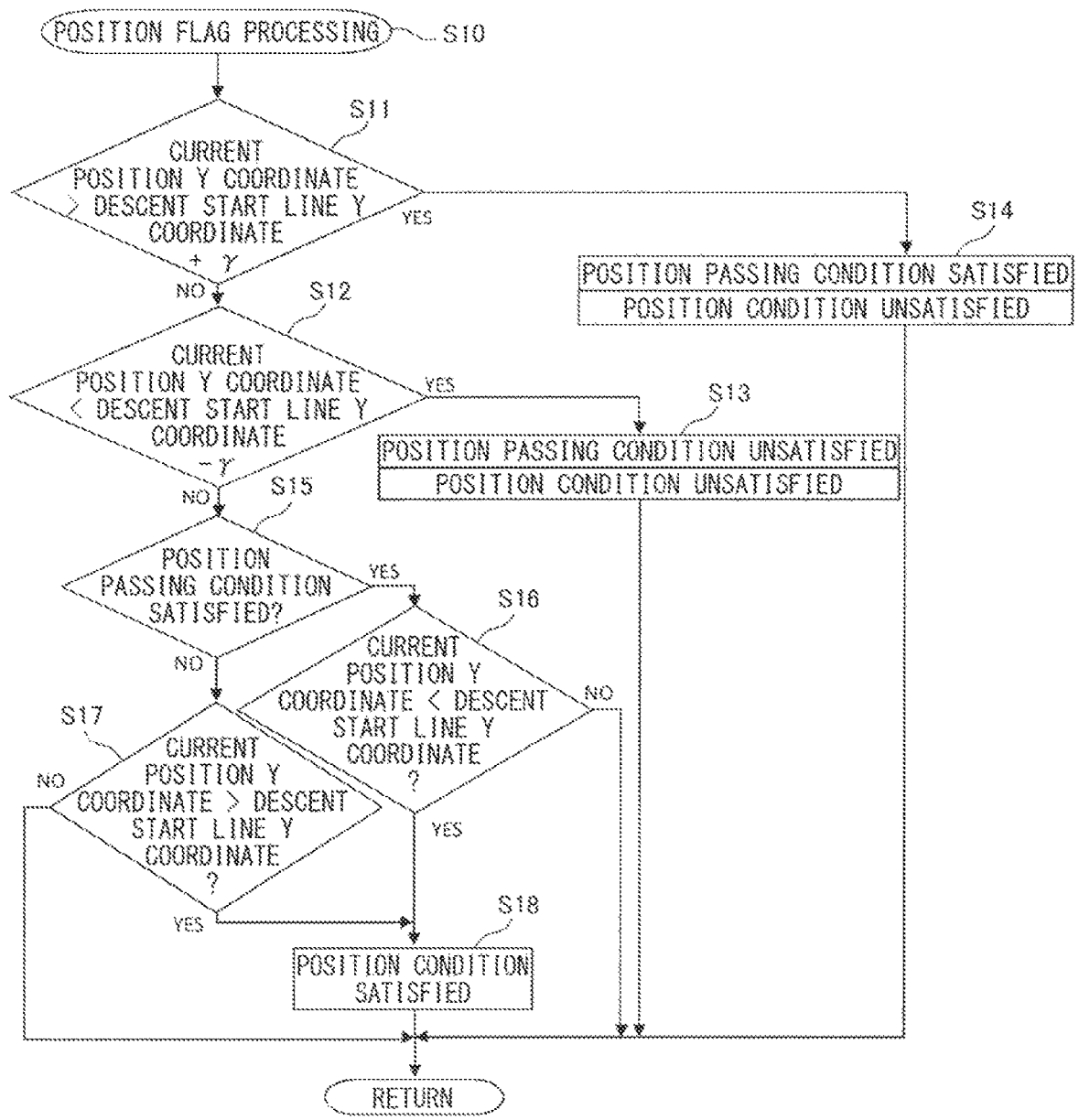
FIG. 14 is a flowchart of position flag processing.

Even in the case where the current position has reached the descent start line, it is not determined that the traveling body 2 has appropriately reached the descent start line and the descent of the rotary cultivator 3 is not started, when the body angle is greatly deviated from the path L2, when the steering sensor 15 is in the ON state, and when the traveling body 2 is roving backward. FIG. 14 illustrates a subroutine of position flag processing (step S10) of determining whether or not a position condition for determining that the traveling body 2 has appropriately reached the descent start line is satisfied. When the Y coordinate of the current position is larger than the value obtained by adding the hysteresis value γ to the Y coordinate of the descent start line (YES in step S11), the controller 52 sets a position condition flag off, sets a position passing condition flag on (step S14), and returns the process to the main routine. Here, the position condition flag is one of conditions for setting on a descent flag for the controller 52 to start the descent of the rotary cultivator 3 in position determination processing that will be described in detail later, and is a flag indicating that the current position has reached the descent start line. In addition, the position passing condition flag is a flag indicating that the current position has reached the descent start line but has passed the descent start line without satisfying the conditions for lowering the rotary cultivator 3.

In the case where the Y coordinate of the current position is equal to or smaller than the value obtained by adding the hysteresis value γ to the Y coordinate of the descent start line in step S11 (NO in step S11), the controller 52 determines whether or not the Y coordinate of the current position is smaller than a value obtained by subtracting the hysteresis value γ front the Y coordinate of the descent start line (step S12). In the case where the Y coordinate of the current position is smaller than the value obtained by subtracting the hysteresis value γ from the Y coordinate of the descent start line in step S12 (YES in step S12), the controller 52 sets both the position condition flag and the position passing condition flag off (step S13), and returns the process to the main routine. In the case where the Y coordinate of the current position is equal to or larger than the value obtained by subtracting the hysteresis value γ from the Y coordinate of the descent start line in step S12 (NO in step S12), the controller 52 determines whether or not the position passing condition flag is on (step S15).

In the case where the position passing flag is on in step S15 (YES in step S15) and the Y coordinate of the current position is smaller than the Y coordinate of the descent start line (YES in step S16) and in the case where the position passing condition flag is off (NO in step S15) and the Y coordinate of the current position is larger than the Y coordinate of the descent start line (YES in step S17), the controller 52 sets the position condition flag on (step S18). In the case where the Y coordinate of the current position is equal to or larger than the Y coordinate of the descent start line in step S16 (NO in step S16) and in the case where the Y coordinate of the current position is equal to or smaller than the Y coordinate of the descent start line in step S17 (NO in step S17), the controller 52 returns the process to the main routine.

Position Determination Processing

Figure 15:
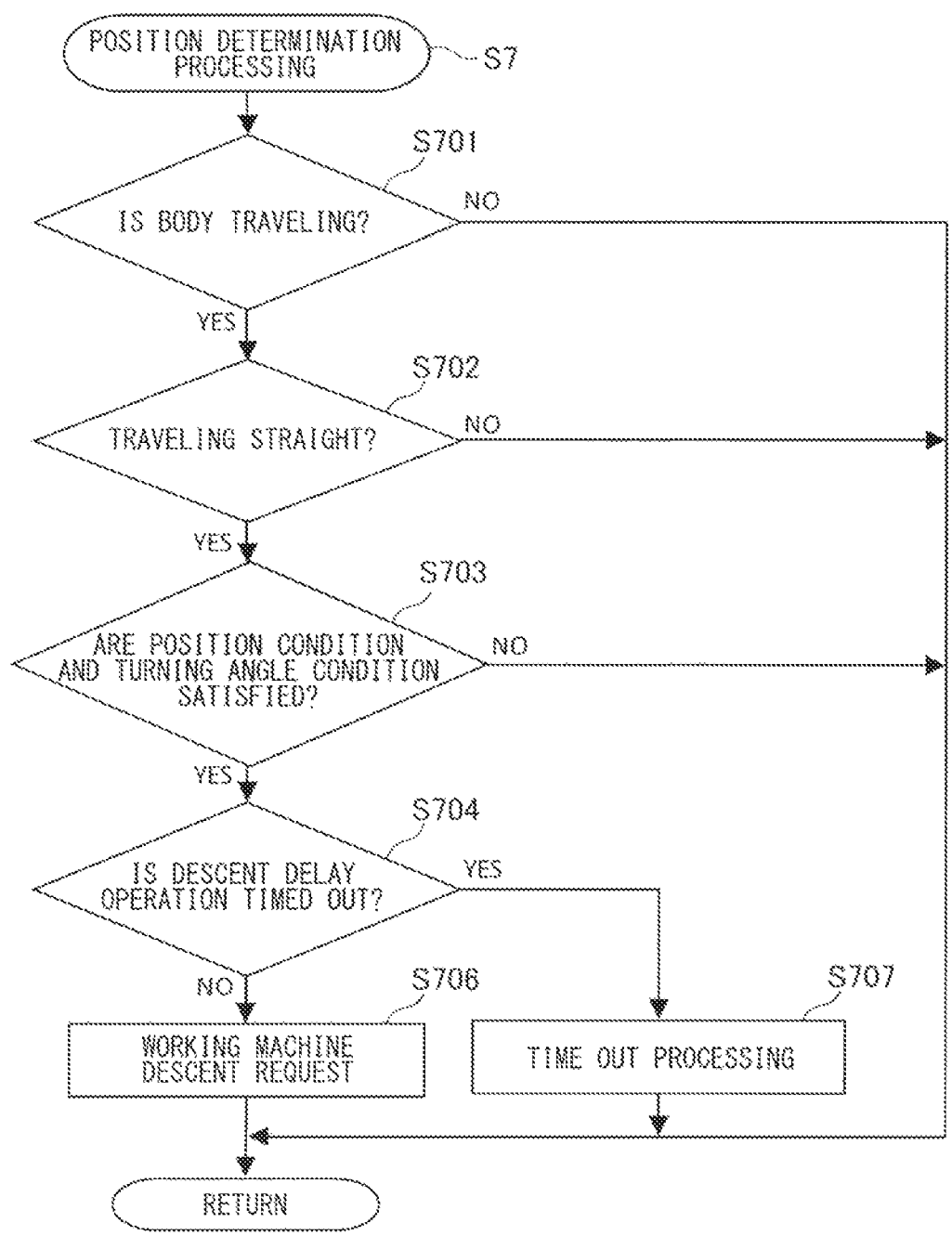
FIG. 15 is a flowchart of position determination processing.

FIG. 15 illustrates a subroutine of position determination processing (step S7) of issuing a descent request for the rotary cultivator 3 on the basis of the result of the position flag processing (step S10). First, the controller 52 determines whether or not the vehicle speed is a non-zero value (step S701), returns the process to the main routine when the vehicle speed is 0 (NO in step S701), and determines whether or not the steering sensor 15 is in the OFF state and the shuttle lever 35 is positioned in the forward movement position (step S702) when the vehicle speed is a non-zero value (YES in step S701), In the case where the steering sensor 15 is in the ON state or the shuttle lever 35 is not positioned in the forward movement position in step S702 (NO in step S702), the controller 52 returns the process to the main routine. In the case where the steering sensor 15 is in the OFF state and the shuttle lever 35 is positioned in the forward movement position in step S702 (YES in step S702), the controller 52 determines whether or not the position condition flag and the turning angle condition flag are on (step S703).

In the case where at least one of the position condition flag and the turning angle condition flag is off in step S703 (NO in step S703), the controller 52 returns the process to the main routine, and in the case where the position condition flag and the turning angle condition flag are both on (YES in step S703), the controller 52 determines whether or not a descent delay operation is timed out (step S704). Here, the descent delay operation is an operation of prolongedly moving up in which the quick-up lever 36 is held for a period equal to or longer than the predetermined time t2 in a state of being moved up to the upper position in the auto-down execution state. In the state in which the descent delay operation is performed, a temporary stop symbol 51g is displayed in the warning display portion 51d as illustrated in FIG. 18D, a temporary stop state in which the descent of the rotary cultivator 3 is regulated is taken, and the position of the upper limit height of the rotary cultivator 3 is maintained even in the case where the other conditions for starting the descent of the rotary cultivator 3 are satisfied. That is, the descent of the rotary cultivator 3 is stopped while the quick-up lever 36 is positioned at the upper position. In the descent delay operation, when a predetermined time t3 longer than t2 has elapsed in a state in which the operator has prolongedly moved up and is holding the quick-up lever 36, the descent delay operation is timed out. For example, the predetermined time t3 is set to 10 seconds. In the case where the descent delay operation is timed out in step S704 (YES in step S704), the controller 52 sets the auto-down cancellation flag on as timeout processing, causes the warning display portion 51d to display a stop symbol 51f as illustrated in FIG. 18C until a predetermined time t4 elapses (step S707), and ret is the process to the main routine. In the case where the descent delay operation is not timed out in step S704 (NO in step S704), the controller 52 sets on the working machine descent flag for starting the descent of the rotary cultivator 3 and issues a descent request (step 706), and returns the process to the main routine. In addition, after the descent delay operation, if the operator releases the hand operating the quick-up lever 36 within the predetermined time t3, the descent delay operation is cancelled, starting the descent of the rotary cultivator 3 becomes possible again, and the warning display portion 51d displays a screen illustrated in FIG. 18B.

Descent Start Processing

Figure 16:
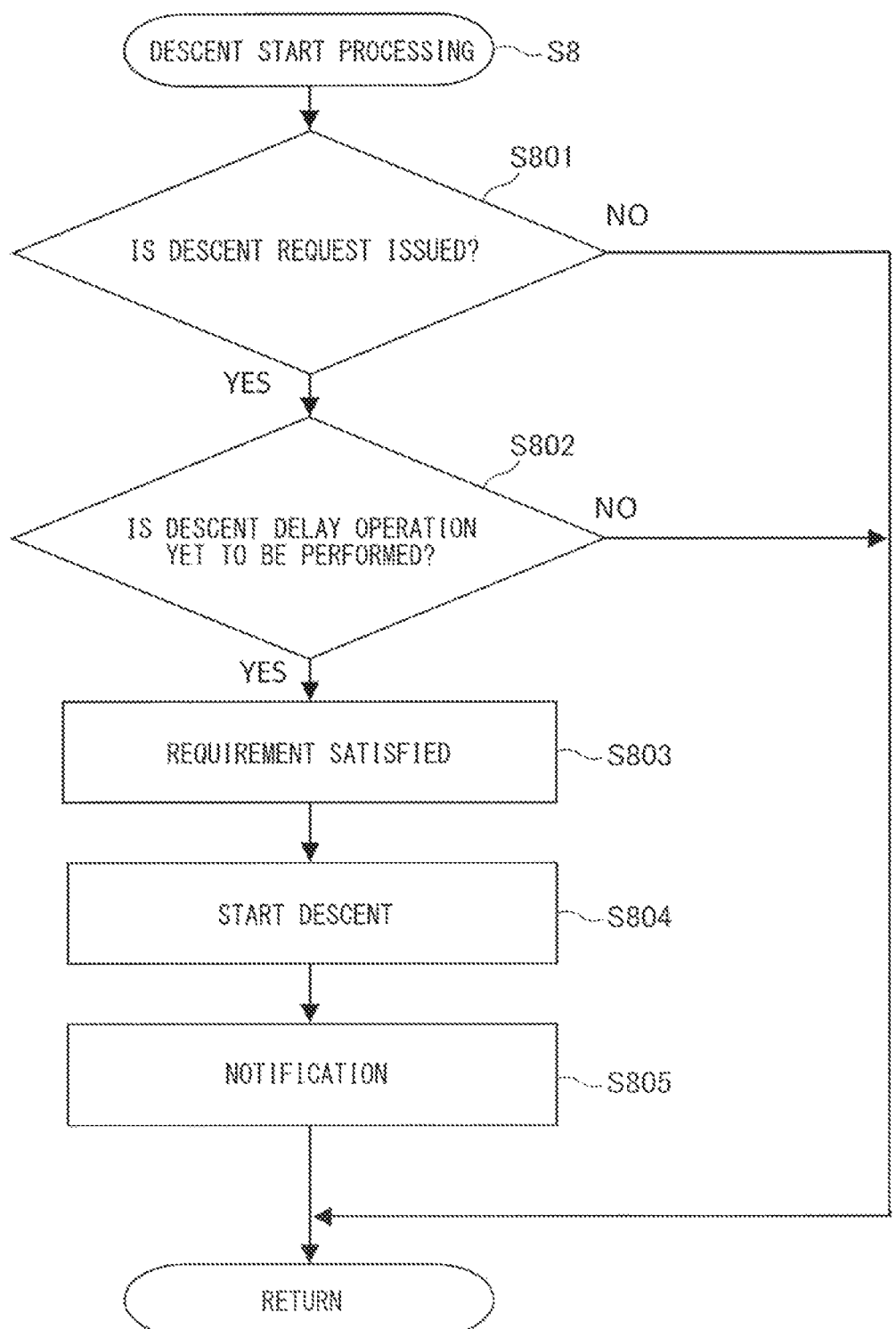
FIG. 16 is a flowchart of descent start processing.

FIG. 16 illustrates a subroutine of descent start processing (step S8) in which the descent of the rotary cultivator 3 is started in response to operation of the lift arm valve 20 on the basis of the descent request. First, the controller 52 determines whether or not a working machine descent flag is on (step S801), and when the working machine descent flag is off (NO in step S801), returns the process to the main routine. When the working machine descent flag is on (YES in step S801), the controller 52 determines whether or not the descent delay operation is yet to be performed by the operator (step S802). In the case where the descent delay operation has been performed by the operator in step S802 (NO in step S802), the controller 52 returns the process to the main routine. In the case where the descent delay operation has not been performed (YES in step S802), the controller 52 sets the working machine descent flag off (step S803), and starts the descent of the rotary cultivator 3 (step S804). At the same time, the controller 52 causes the warning display portion 51d to display a "descending" symbol 51h as illustrated in FIG. 18E, notifies the operator that the rotary cultivator 3 is descending by the sound from the notification buzzer 53 (step S805), and returns the process to the main routine.

The operator continues the forward traveling of the traveling body 2 in a state in which the descent of the rotary cultivator 3 has been started, the transmission of the driving force from the PTO shaft to the rotary cultivator 3 is resumed to rotate the rotary 3b, and the cultivation operation is resumed when the rotary 3b is landed.

Automatic Finishing Processing

Figure 17:
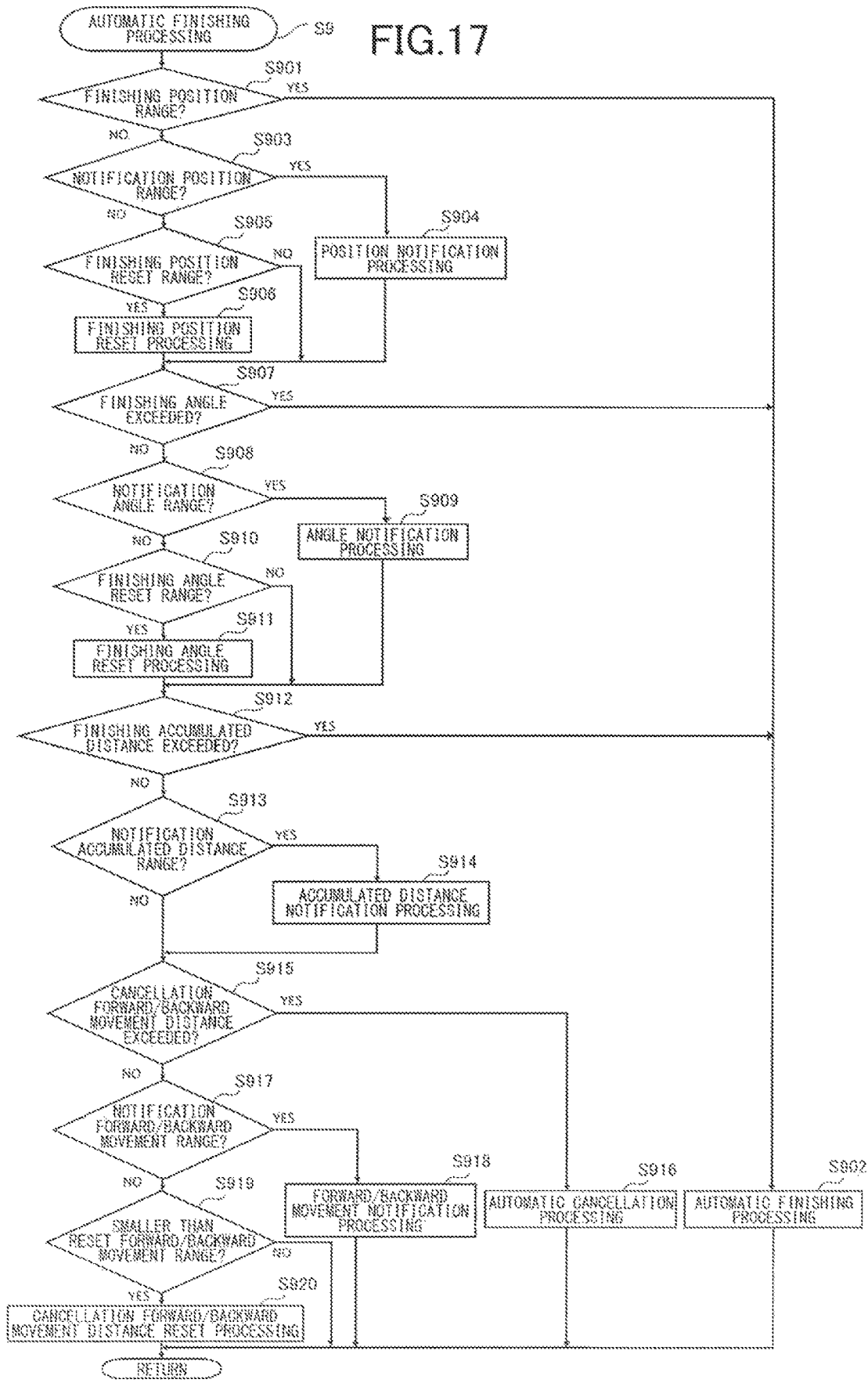
FIG. 17 is a flowchart of automatic finishing processing.

FIG. 17 illustrates a subroutine of automatic finishing processing of cancelling the auto-down execution state on the basis of the traveling path of the traveling body 2 in the auto-down execution state. As conditions for cancelling the auto-down execution state, an auto-down finishing condition in which the controller 52 takes the auto-down OFF state and an auto-down cancellation condition in which the controller 52 takes the auto-down cancellation state are provided.

First, the controller 52 performs processing related to an auto-down finishing position condition serving as a first auto-down finishing condition. The controller 52 determines, in the auto-down execution state and on the basis of a predetermined finishing distance $\varepsilon1$, whether or not the current position is in a finishing position range that is a range outside a square defined by XY coordinates $(X, Y)=(-\varepsilon1, \varepsilon1), (-\varepsilon1, \varepsilon1), (\varepsilon1, -\varepsilon1), \text{ and } (\varepsilon1, \varepsilon1)$ (step S901). In the case where the current position is in the finishing position range in step S901 (YES in step S901), the controller 52 causes the notification display portion 51e to display an auto-down control position cancellation screen "Automatic operation will be cancelled due to positional restriction." illustrated in FIG. 18G for a predetermined time t4, performs the automatic finishing processing of switching the controller 52 to the auto-down OFF state (step S902), and returns the process to the main routine. After the elapse of the predetermined time t4, the controller 52 causes the notification display portion 51e to display the engine speed/use time indicator illustrated in FIG. 18A, and causes the auto-down state display portion 51a to display the temperature/fuel indicator illustrated in FIG. 18A, As described above, in the case where the auto-down OFF state is taken due to the auto-down finishing condition, in order to recover to the auto-down ON state, the pivot position of the auto-down timing volume 33 needs to be changed from the OFF position to the ON position again, in a state in which conditions that the controller 52 is in the working mode and the pivot position of the lifting height volume 32 is at the lifting height adjustment position are both satisfied, after once pivoting the auto-down timing volume 33 to the OFF position.

In the case where the current position is not in the finishing position range in step S901 (NO in step S901), the controller 52 determines, on the basis of the finishing distance ε1 and a predetermined notification distance ε2 smaller than the finishing distance ε1, whether or not the current position is in a notification position range defined by −ε1≤X coordinate <−ε2, or ε2<X coordinate ≤ε1 and −ε1≤Y coordinate <−ε2, or ε2<Y coordinate≤ε1 (step S903). In the case where the current position is in the notification position range in step S903 (YES in step S903), the notification display portion 51e is caused to display an auto-down control position notification screen "Exceeding positional restriction" illustrated in FIG. 18F as position notification processing, and tints the operator is notified of cancellation of the auto-down execution state in advance (step S904).

In the case where the current position is not in the notification position range in step S903 (NO in step S903), the controller 52 determines, on the basis of a predetermined reset distance ε3 smaller than the finishing distance ε1 and the notification distance ε2, whether or not the current position is in a finishing position reset range that is a range inside a square defined by XY coordinates (X, Y)=(−ε3, −ε3), (−ε3, ε3), (ε3, −ε3), and (ε3, ε3) (step S905). In the case where the current position is within the finishing position reset range in step S905 (YES in step S905), the controller 52 causes the notification display portion 51e to display the engine speed/use time indicator as illustrated in FIG. 18A as finishing position reset processing (step S906).

Next, the controller 52 performs processing related to an auto-down finishing angle condition serving as a second auto-down finishing condition. The controller 52 determines whether or not the body angle in the auto-down execution state is larger than a predetermined finishing angle λ1 (step S907). When the body angle is larger than the finishing angle λ1 (YES in step S907), the controller 52 causes the notification display portion 51e to display an auto-down angle cancellation screen "Automatic operation will be cancelled due to angle restriction" for the predetermined time t4, performs automatic finishing processing of switching the controller 52 to the auto-down OFF state (step S902), and returns the processing to the main routine. After the elapse of the predetermined time, the controller 52 curses the notification display portion 510 to display the engine speed/use time indicator and the auto-down state display portion 51a to display the temperature/fuel indicator as illustrated in FIG. 18A.

In the case where the body angle is not larger than the finishing angle λ1 in step S907 (NO in step S907), the controller 52 determines, on the basis of a predetermined notification angle λ2 smaller than the finishing angle λ1, whether or not the body angle is in a notification angle range larger than λ2 and equal to or smaller than λ1 (step S908). In the case where the body angle is in the notification angle range in step S908 (YES in step S908), the notification display portion 51e is caused to display an auto-down angle notification screen "Exceeding the angle restriction" as angle notification processing, and the operator is notified of cancellation of the auto-down execution state in advance (step S909).

In the case where the body angle is not in the notification angle range in step S908 (NO in step S908), the controller 52 determines whether or not the body angle is smaller than a reset angle λ3 smaller than the notification angle λ2 (step S910). In the case where the body angle is smaller than the reset angle λ3 in step S910 (YES in step S910), the controller 52 causes the notification display portion 51e to display the engine speed/use time indicator as illustrated in FIG. 18A as finishing angle reset processing (step S911).

Next, the controller 52 performs processing related to an automatic finishing accumulated distance condition serving as a third auto-down finishing condition. The controller 52 determines whether or not the accumulated traveling distance from the start of the auto-down execution state to the end of the auto-down execution state is larger than a predetermined finishing accumulated distance ξ1 (step S912). Here, the accumulated traveling distance is a distance obtained by summing up all the movement distance of the body standard point 2a from the start of the auto-down execution state to the end of the auto-down execution state regardless of whether the movement is forward movement or backward movement or whether or not temporary stop of traveling has occurred. In the case where the accumulated traveling distance is larger than the finishing accumulated distance ξ1 in step S912 (YES in step S912), the controller 52 causes the notification display portion 51e to display an auto-down accumulated distance cancellation screen "Automatic operation will be cancelled due to traveling restriction" for the predetermined time 14, performs automatic finishing processing of switching the controller 52 to the auto-down OFF state (step S902), and returns the process to the main routine. After the elapse of the predetermined time t4, the controller 52 causes the notification display portion 51e to display the engine speed/use time indicator and the auto-down state display portion 51a to display the temperature/fuel indicator as illustrated in FIG. 18A.

In the case where the accumulated traveling distance is not larger than the finishing accumulated distance ξ1 in step S912 (NO in step S912), the controller 52 determines, on the basis of a notification accumulated distance ξ2 smaller than the finishing accumulated distance ξ1, whether or not the accumulated traveling distance is in a notification accumulated distance range larger than the notification accumulated distance ξ2 and equal to or smaller than the finishing accumulated distance ξ1 (step S913). In the case where the accumulated traveling distance is in the notification accumulated distance range in step S913 (YES in step S913), the controller 52 causes the notification display portion 51e to display an auto-down accumulated distance notification screen "Exceeding the traveling restriction" as accumulated distance notification processing, and thus notifies the operator of cancellation of the auto-down execution state in advance (step S914).

Next, the controller 52 determines whether or not a cancellation forward backward movement condition serving as an auto-down cancellation condition is satisfied (step S915). Here, the cancellation forward/backward movement condition is satisfied when a straight movement distance that is a distance of movement continuously performed by the traveling body 2 by only forward/backward movement since the controller 52 is switched to the auto-down execution state until the controller 52 is no longer in the auto-down execution state in a state in which the steering sensor 15 is never turned on exceeds a predetermined cancellation forward/backward movement distance ρ1 smaller than the reset distance ε3. In the case where the cancellation forward/backward movement condition is satisfied in step S915 (YES in step S915), the controller 52 performs automatic cancellation processing, causes the notification display portion 51e to display an auto-down accumulated distance cancellation screen "Control is cancelled due to the traveling restriction" for the predetermined time t4, sets the auto-down cancellation flag on (step S916) to take the auto-down cancellation state, and returns the process to the main routine. After the elapse of the predetermined time t4, the controller 52 causes the notification display portion 51e to display the engine speed/use time indicator and the auto-down state display portion 51a to display the temperature/fuel indicator as illustrated in FIG. 18A.

In the case where the cancellation forward/backward movement condition is not satisfied in step S915 (NO in step S915), the controller 52 determines, on the basis of a predetermined notification forward/backward movement distance ρ2 smaller than the cancellation forward/backward movement distance ρ1, whether or not the straight movement distance is in a notification forward/backward movement range larger than the notification forward/backward movement distance ρ2 and equal to or smaller than the cancellation forward/backward movement distance ρ1 (step S917). In the case where the straight movement distance is in the notification forward/backward movement range in step S917 (YES in step S917), the controller 52 causes the notification display portion 51e to display an auto-down accumulated distance notification screen "Exceeding the traveling restriction" as forward/backward movement notification processing, thus notifies the operator of cancellation of the auto-down execution state in advance (step S918), and returns the process to the main routine.

In the case where the straight movement distance is not in the notification forward/backward movement range in step S917 (NO in step S917), the controller 52 determines whether or not the straight movement distance is smaller than a predetermined reset forward/backward movement distance ρ3 smaller than the notification forward/backward movement distance ρ2 (step S919). In the case where a straight movement rear distance is smaller than the reset forward/backward movement distance ρ3 in step 919 (YES in step S919), the notification display portion 51e is caused to display the engine speed/use time indicator as illustrated in FIG. 18A as cancellation forward/backward movement distance reset processing (step S920), and the process is returned to the main routine.

In addition, in step S1, the controller 52 performs processing related to a quick-up cancellation condition serving as an auto-down cancellation condition. When the quick-up lever 36 is moved down for a period equal to or longer than a predetermined time t7 in the auto-down execution state, the controller 52 starts the descent of the rotary cultivator 3, sets the auto-down cancellation flag on, and takes the auto-down cancellation state. In addition, when the quick-up lever 36 is briefly moved up for a period shorter than the predetermined time t2 in the auto-down execution state, the controller 52 causes the warning display portion 51d to display the stop symbol 51f illustrated in FIG. 18C until the predetermined time t4 elapses, sets the auto-down cancellation flag on, and takes the auto-down cancellation state.

As described above, since the controller 52 sets the descent start the coordinate system having the turning start position of the traveling body 2 as the origin O and lowers the rotary cultivator 3 when the current position of the traveling body 2 reaches the descent start line, the operator can turn the traveling body 2 by selecting an arbitrary path in the case where the tractor 1 travels back and forth to perform the cultivation operation of the field H. In addition, the timing for starting the descent of the rotary cultivator 3 does not have to be determined by oneself, and thus the headland width M from the ridge edge E can be made constant with high precision regardless of how high the steering skill of the operator is. In addition, erroneous operation such as the operator starting the descent of the rotary cultivator 3 at a wrong timing, formation of non-cultivated portion of the field H, and redundant cultivation operation can be prevented, and thus efficient cultivation operation can be performed.

In addition, since the auto-down cancellation state is switched to the auto-down execution state and the descent start line is set in the coordinate system having the turning start position as the origin O in response to detecting one of switching of the shuttle lever 35 from the neutral position to the backward movement position in a state in which the backup mode is in the ON state and the rotary cultivator 3 is not positioned at the upper limit height, switching of the steering sensor 15 from the OFF state to the ON state in a state in which the tuning up mode is in the ON state and the rotary cultivator 3 is not positioned at the upper limit height, and an operation of moving up the quick-up lever 36 for a period equal to or longer than the predetermined time t1, many different turning operation procedures corresponding to what the operator likes or the like can be supported, the flexibility of the operation performed by the operator can be improved, and the operation load put on the operator can be reduced by reducing unnecessary operation steps.

In addition, since the controller 52 does not lower the rotary cultivator 3 in a state in which the body angle does not satisfy the turning angle condition even when the traveling body 2 reaches the descent start line, descent of the rotary cultivator 3 not intended by the operator can be prevented. In addition, since the descent start line is defined only by the coordinate of the body standard point 2a in the front-rear direction at the start of the turning, the operator can freely select the position of the traveling body 2 in the left-right direction when resuming the operation, for example, the cultivation operation can be performed on every other row. Therefore, the flexibility of operation can be improved, and the processing load on the controller 52 can be reduced.

In addition, since the controller 52 stores the turning inner circumferential length and the turning outer circumferential length for each of the front wheel double speed-ON 4WD mode, the front wheel double speed-OFF 4WD mode, and the automatic brake mode in advance and calculates the current position on the basis of the turning inner circumferential length and the turning outer circumferential length corresponding to the selected mode, deviation of the calculation result of the descent start line from the position at which the operator expects the rotary cultivator 3 to start descending derived from the difference between these modes can be reduced, and thus the headland width M from the ridge edge can be made constant at a predetermined width with high precision.

In addition, since the controller 52 is configured not to take the auto-down execution state when the 2WD mode or a high speed level of a predetermined reduction ratio or lower that is not suitable for the cultivation operation in the field H is selected, descent of the rotary cultivator 3 not intended by the operator can be prevented. In addition, since the controller 52 sets the descent start line on the basis of the upper limit height of the rotary cultivator 3 and the vehicle speed in the auto-down execution state, variation of the landing position derived from the time taken from the start of the descent to the landing of the rotary cultivator 3 can be prevented, and the headland width M from the ridge edge can be made constant at a predetermined width with high precision.

In addition, since the controller 52 sets the descent start line on the basis of the upper limit height of the rotary cultivator 3 adjusted by operating the lifting height volume 32, variation of the landing position derived from the time taken from the start of the descent to the landing of the rotary cultivator 3 can be prevented, and the headland width M from the ridge edge can be made constant at a predetermined width with high precision. In addition, since the descent speed of the rotary cultivator 3 by the auto-down control can be adjusted by operating the working machine descent speed adjustment knob 29 and the controller 52 sets the descent start line on the basis of the descent speed of the rotary cultivator 3, the usability can be improved, variation of the landing position derived from the time taken front the start of the descent to the landing of the rotary cultivator 3 can be prevented, and the headland width M from the ridge edge can be made constant at a predetermined width with high precision. In addition, since the Y coordinate of the descent start line can be adjusted by the auto-down timing volume 33, a case where there is an error in the descent start line due to slip of the traveling apparatus such as the front wheels 5 and the rear wheels 6 and a case where the cultivation operation is performed in a field that is not rectangular, for example, in a field having a trapezoidal shape can be easily addressed, the usability can be improved, and the headland width M from the ridge edge can be made constant at a predetermined width with high precision.

In addition, since the descent of the rotary cultivator 3 can be temporarily stopped by prolongedly moving up the quick-up lever 36 for a period equal to or longer than the predetermined time t2 in the auto-down execution state, the operator can temporarily stop the start of descent of the rotary cultivator 3 when it is estimated that the timing of start of the descent of the rotary cultivator 3 by the auto-down control is earlier than the timing desired by the operator due to slip of the front wheels 5 or the rear wheels 6, an error in the steering operation by the operator, or the like. In addition, due to the previous notification made by changing the interval of the short sound from the notification buzzer 53 from t5 to t6, the operator can know in advance the timing at which the rotary cultivator 3 starts descending, temporarily stop the rotary cultivator 3 when it is determined that the timing for starting the descent of the rotary cultivator 3 is too early on the basis of the previous notification, and start the descent of the rotary cultivator 3 while visually recognizing the resume position of the operation. In addition, since the auto-down execution state is cancelled by briefly moving up the quick-up lever 36 for a period shorter than the predetermined time t2 in the auto-down execution state, the descent of the rotary cultivator 3 can be easily interrupted, and the auto-down execution state can be taken again by further moving up the quick-up lever 36. Therefore, the operator can easily start over the turning, and thus the usability can be improved.

In addition, since the controller 52 starts the notification to the operator by the short sound from the notification buzzer 53 when switched to the auto-down execution state and shortens the interval of the short sound from the notification buzzer 53 when the body angle is in the turning completion angle range and the Y coordinate of the body standard point 2a reaches a position within the predetermined distance β to the descent start line, the operator can know that the auto-down execution state is taken and that the descent start line is near in advance, and thus the operator can estimate the difference from the cultivation resume position of the automatic descent of the rotary cultivator 3 by the auto-down control and the cultivation resume position desired by the operator. In addition, since the controller 52 starts the notification to the operator by display of the liquid crystal display apparatus 51 when switched to the auto-down execution state, causes the direction of the descent start line based on the current position of the traveling body 2 to be displayed, and changes the display in accordance with the distance to the descent start line, the operator can know to which direction the traveling body 2 should be steered and that the descent start line is near in advance. As a result of this, the operation load on the operator can be reduced, and the operator can estimate the difference from the cultivation resume position of the automatic descent of the rotary cultivator 3 by the auto-down control and the cultivation resume position desired by the operator before the rotary cultivator 3 starts descending.

In addition, since the controller 52 calculates the current position and the body angle of the traveling body 2 in the auto-down execution state and takes the auto-down OFF state when the traveling body 2 is away from the turning start position by a distance longer than the predetermined distance ε1, when the turning angle is away from 180° by a predetermined angle or more, or when the accumulated traveling distance of the traveling body 2 is larger than the predetermined distance ξ1, descent of the rotary cultivator 3 not intended by the operator can be prevented when traveling on the headland after finishing the cultivation operation performed while moving back and forth in the field H, when traveling outside the field, or the like.

In addition, since the controller 52 cancels the auto-down execution state while maintaining the auto-down ON state when the straight movement distance exceeds the predetermined forward/backward movement cancellation distance ρ, descent of the rotary cultivator 3 not intended by the operator can be prevented, and the auto-down execution state can be recovered by a simple operation.

In addition, since the position of the traveling body 2 in the auto-down execution state is calculated by using the steering sensor 15 and the vehicle speed sensor 11, for which cheap contact switches, optical sensors, and the like can be used, instead of using gyro sensors, GPSs, and the like, which are expensive, the cost can be suppressed. Since the current position and the body angle of the traveling body 2 are calculated on the basis of the value of the turning radius r that changes depending on the maximum output of the engine and the type and dimensions of the traveling apparatus such as the front wheels 5 and the rear wheels 6 in the auto-down control, the same controller 52 can be used for traveling bodies 2 having different turning radiuses r. In addition, since the turning radius r of the traveling body 2 is calculated on the basis of whether or not the front wheel double speed control or the automatic brake control is performed, and the current position and the body angle of the traveling body 2 are calculated using this inning radius r, the calculation precision of the current position of the traveling body 2 can be improved, and the headland width M from the ridge edge can be made constant at a predetermined width with high precision.

To be noted, although the vehicle speed is obtained by detecting the rotation of one of the rear wheels 6 and the rotation of the rear wheel driving shaft, rotation of other parts may be detected instead. For example, the rotation of a drive shall may be detected instead of the rotation of the rear wheel driving shaft, or rotation of both of the left and right rear wheels 6 may be detected. To be noted, although the main transmission mechanism and the sub-transmission mechanism are configured as multi-step transmission mechanisms, the main transmission mechanism and the sub-transmission mechanism may be continuously variable transmission mechanisms or a configuration in which only one of these is provided may be employed as long as the total reduction ratio that is a ratio of the number of rotations of the engine to the number of rotations of the rear wheels 6 can be detected, be noted, an ascending operation of the rotary cultivator 3 by operating the position lever 31 may be added as a turning start operation.

To be noted, although the visual notification to the operator is performed by the change in the pattern and notification sentence on the liquid crystal display apparatus 51, the notification may be alternatively performed by the display on an organic EL display; or a dot matrix display apparatus of LED lamps other than liquid crystal, or performed by the change in the color or position of light emission of the display apparatus. To be noted, the various operation tools used for input to the controller 52 may alternatively be a touch panel provided in the liquid crystal display apparatus 51 or an input device provided outside of the traveling body 2 capable of wireless communication. To be noted, a configuration provided with a remote operation apparatus by which the operator steers the tractor 1 from a remote place without getting on the tractor 1 may be employed, and a structure in which the front wheels 5 are steered by driving the steering apparatus by a motor, hydraulic control, and the like may be employed. To be noted, the steering wheel 13 may be a swingable or horizontally movable lever, a button, or the like, the operation of the steering wheel 13 is not limited to detection of either one of the ON state and the OFF state, and a configuration in which the operation angle can be detected as a numerical value and the controller 52 can perform calculation on the basis of the turning radius r calculated in accordance with the operation angle may be employed. To be noted, regarding the operation of the steering wheel 13, the pivot of the steering wheel 13 may be directly detected, or detected from the amount of movement of the tie rods or the amount of inclination of the front wheels 5. To be noted, the controller 52 may be formed by a discrete circuit, or may be integrally formed as a semiconductor integrated circuit element.

To be noted, although the tractor 1 including the rotary cultivator 3 has been described in the embodiment described above, this is not limiting. The working machine may be a puddling working machine, a plow, or the like, and can be similarly applied to other working vehicles such as a rice planting machine in which the traveling body 2 is provided with a working machine that can be lifted and lowered.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The present invention can be applied to working vehicles such as tractors, and is particularly suitable for working vehicles that perform ascending/descending control of a working machine at the time of turning.

What is claimed is:
1. A working vehicle comprising:
a traveling body supported by a traveling apparatus;
a working machine, supported by the traveling body;
a steering portion that steers the traveling body;
a lifting/lowering apparatus that lifts and lowers the working machine; and
a controller configured to lift the working machine, via the lifting/lowering apparatus, from a working position to a non-working position in response to a steering operation of the steering portion,
wherein the controller is configured to execute a turning control which includes a working machine descent start line setting process, a coordinates calculating process, and a working machine lowering process, the working machine descent start line setting process being a process where the controller sets working machine descent start line in a coordinate plane based on an ascending start position of the working machine and a traveling distance by which the traveling body travels in a period when the working body descends from the non-working position to the working position, the coordinate plane being in parallel to a horizontal plane and having a position of the traveling body at a start of turning as an origin, the coordinates calculating process being a process where the controller calculates coordinates of the traveling body based on the steering operation of the steering portion and a traveling distance of the traveling body, the working machine lowering process being a process where the controller starts lowering the working machine via the lifting/lowering apparatus in a case where the traveling body has reached the working machine descent start line in a state in which the traveling body has completed the turning.

2. The working vehicle according to claim 1, further comprising an operation tool operable between a first position and a second position,
> wherein the controller has an execution state in which the turning control is capable of being performed and a cancellation state in which the turning control is not capable of being performed, and is switched between the execution state and the cancellation state in response to the operation tool being held at the first position for a period shorter than a predetermined time and then moved to the second position, and
>
> wherein, in a case where the operation tool is held at the first position for a period equal to or longer than the predetermined time in the execution state, the lowering of the working machine is stopped while the operation tool is positioned at the first position.

3. The working vehicle according to claim 1, further comprising a display apparatus comprising a first display portion that instructs an operation direction of the steering portion such that the traveling body reaches the working machine descent start line, and a second display portion that displays a positional relationship between the coordinates of the traveling body and the working machine descent start line.

* * * * *